(12) United States Patent
Austrheim

(10) Patent No.: US 12,151,894 B2
(45) Date of Patent: Nov. 26, 2024

(54) SYSTEM AND APPLICABLE METHODS OF COLLECTING ITEMS FROM STORAGE CONTAINERS USING ROBOTIC OPERATOR

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 756 days.

(21) Appl. No.: 15/734,431

(22) PCT Filed: Jun. 11, 2019

(86) PCT No.: PCT/EP2019/065145
§ 371 (c)(1),
(2) Date: Dec. 2, 2020

(87) PCT Pub. No.: WO2019/238641
PCT Pub. Date: Dec. 19, 2019

(65) Prior Publication Data
US 2021/0221618 A1    Jul. 22, 2021

(30) Foreign Application Priority Data

Jun. 12, 2018  (NO) .................................. 20180813
Jul. 19, 2018  (NO) .................................. 20181005
(Continued)

(51) Int. Cl.
*B65G 1/137* (2006.01)
*B65G 1/04* (2006.01)
(Continued)

(52) U.S. Cl.
CPC ......... *B65G 1/1378* (2013.01); *B65G 1/0464* (2013.01); *B65G 1/0478* (2013.01);
(Continued)

(58) Field of Classification Search
CPC .. B65G 1/0464; B65G 1/0478; B65G 1/1375; B65G 61/00; B65G 1/0414
(Continued)

(56) References Cited

U.S. PATENT DOCUMENTS

| 3,519,150 A | 7/1970 | Keena et al. |
| 3,800,963 A | 4/1974 | Holland |

(Continued)

FOREIGN PATENT DOCUMENTS

| CA | 2988122 A1 | 12/2016 |
| CN | 101553416 A | 10/2009 |

(Continued)

OTHER PUBLICATIONS

Office Action issued in the counterpart Chinese Patent Application No. 201980037723X, dated Sep. 27, 2021 (25 pages).

(Continued)

*Primary Examiner* — Jacob S. Scott
*Assistant Examiner* — Michael E Butler
(74) *Attorney, Agent, or Firm* — Baker Botts L.L.P.

(57) ABSTRACT

An automated storage and retrieval system includes an automated storage and retrieval grid and a delivery system. The automated storage and retrieval grid includes a container handling vehicle rail system for guiding a plurality of container handling vehicles, the container handling vehicle rail system including a first set of parallel rails arranged in a horizontal plane (P) and extending in a first direction (X), and a second set of parallel rails arranged in the horizontal plane (P) and extending in a second direction (Y) which is orthogonal to the first direction (X), which first and second sets of rails form a grid pattern in the horizontal plane (P) comprising a plurality of adjacent container handling vehicle grid cells, each container handling vehicle grid cell includ- (Continued)

ing a container handling vehicle grid opening defined by a pair of neighboring rails of the first set of rails and a pair of neighboring rails of the second set of rails, the container handling vehicles being operable to retrieve a storage container from a stack of storage containers beneath the container handling rail system; a plurality of container handling vehicles operable on the container handling vehicle rail system, the container handling vehicles being operable to retrieve a storage container from a stack of storage containers beneath the container handling rail system; and a delivery column adapted for transport of a storage container between a container handling vehicle and a delivery port situated at a lower end of the delivery column. The delivery system includes: a delivery rail system, the delivery rail system comprising a first set of parallel rails arranged in a horizontal plane (P1) and extending in a first direction (X), and a second set of parallel rails arranged in the horizontal plane (P1) and extending in a second direction (Y) which is orthogonal to the first direction (X), and a remotely operated delivery vehicle configured to travel on the delivery rail system, the remotely operated delivery vehicle including a container carrier adapted to support the storage container; a second location on the delivery rail system including a robotic operator for handling of product items in the storage container. The delivery port is arranged at a level above the delivery rails system allowing the delivery vehicle to be positioned directly below the delivery column. The delivery vehicle is further adapted to transport the storage container between a first location represented by the delivery port and the second location. The robotic operator is able to reach multiple positions within the delivery system in order to access storage containers transported on remotely operated delivery vehicles and positioned at different location within the delivery system.

20 Claims, 17 Drawing Sheets

(30) Foreign Application Priority Data

Aug. 2, 2018 (NO) .................................. 20181039
Oct. 19, 2018 (NO) .................................. 20181344

(51) Int. Cl.
*B65G 47/02* (2006.01)
*B65G 61/00* (2006.01)

(52) U.S. Cl.
CPC ......... *B65G 1/0492* (2013.01); *B65G 1/1375* (2013.01); *B65G 47/02* (2013.01); *B65G 61/00* (2013.01); *B65G 1/0414* (2013.01)

(58) Field of Classification Search
USPC ........................................................ 700/218
See application file for complete search history.

(56) References Cited

U.S. PATENT DOCUMENTS

| | | |
|---|---|---|
| 4,538,950 A | 9/1985 | Shiomi et al. |
| 5,538,809 A | 7/1996 | Bittihn et al. |
| 6,011,998 A | 1/2000 | Lichti et al. |
| 7,101,139 B1 | 9/2006 | Benedict |
| 8,628,289 B1 | 1/2014 | Benedict et al. |
| 9,527,669 B1 | 12/2016 | Hanssen et al. |
| 9,988,216 B1 | 6/2018 | McCalib, Jr. et al. |
| 2003/0093176 A1 | 5/2003 | Ohtsuka et al. |
| 2005/0047895 A1 | 3/2005 | Lert |
| 2011/0027059 A1 | 2/2011 | Benedict et al. |
| 2012/0282068 A1 | 11/2012 | Tschurwald et al. |
| 2014/0014470 A1 | 1/2014 | Razumov |
| 2014/0086714 A1 | 3/2014 | Malik |
| 2014/0244026 A1 | 8/2014 | Neiser |
| 2014/0277693 A1 | 9/2014 | Naylor |
| 2014/0288696 A1 | 9/2014 | Lert |
| 2014/0292274 A1 | 10/2014 | Dorval et al. |
| 2014/0311858 A1 | 10/2014 | Keating et al. |
| 2015/0127143 A1* | 5/2015 | Lindbo ............... G05B 15/02 700/218 |
| 2016/0060037 A1 | 3/2016 | Razumov |
| 2016/0129587 A1* | 5/2016 | Lindbo ............... G06Q 10/087 700/218 |
| 2016/0145058 A1 | 5/2016 | Lindbo |
| 2016/0176638 A1 | 6/2016 | Toebes |
| 2016/0325932 A1 | 11/2016 | Hognaland |
| 2017/0050809 A1 | 2/2017 | Itoh et al. |
| 2017/0057745 A1 | 3/2017 | Ueda et al. |
| 2017/0166400 A1 | 6/2017 | Hofmann |
| 2018/0044110 A1 | 2/2018 | Clarke et al. |
| 2018/0068253 A1 | 3/2018 | Simms et al. |
| 2018/0082162 A1 | 3/2018 | Durham et al. |
| 2018/0118078 A1 | 5/2018 | Alkhaldi et al. |
| 2018/0141754 A1 | 5/2018 | Garrett et al. |
| 2018/0150793 A1 | 5/2018 | Lert, Jr. et al. |
| 2018/0370726 A1 | 12/2018 | Grosse et al. |
| 2020/0148474 A1 | 5/2020 | Salichs et al. |

FOREIGN PATENT DOCUMENTS

| | | |
|---|---|---|
| CN | 101711210 A | 5/2010 |
| CN | 102050333 A | 5/2011 |
| CN | 102992012 A | 3/2013 |
| CN | 104066661 A | 9/2014 |
| CN | 104781163 A | 7/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |
| CN | 106829298 A | 6/2017 |
| CN | 206790852 U | 12/2017 |
| CN | 107848707 A | 3/2018 |
| CN | 108140168 A | 6/2018 |
| CN | 108430895 A | 8/2018 |
| CN | 109328150 A | 2/2019 |
| CN | 109982948 A | 7/2019 |
| DE | 40 16 810 C1 | 11/1991 |
| DE | 9310690 U1 | 9/1993 |
| DE | 102009017241 A1 | 10/2010 |
| DE | 102013009340 A1 | 12/2014 |
| EP | 0458021 A1 | 11/1991 |
| EP | 2881905 A1 | 6/2015 |
| EP | 3003932 A1 | 4/2016 |
| EP | 3288865 A1 | 3/2018 |
| GB | 1 267 751 A | 3/1972 |
| GB | 1 276 160 A | 6/1972 |
| GB | 2233319 A | 1/1991 |
| JP | S60-137703 A | 7/1985 |
| JP | S6417707 A | 1/1989 |
| JP | H06-043936 A | 2/1994 |
| JP | H07-067623 B2 | 7/1995 |
| JP | H08-217209 A | 8/1996 |
| JP | H09152914 A | 6/1997 |
| JP | H11-143538 A | 5/1999 |
| JP | 2000-191106 A | 7/2000 |
| JP | 2003-137406 A | 5/2003 |
| JP | 2009-184775 A | 8/2009 |
| JP | 2011-102166 A | 5/2011 |
| JP | 2015-535517 A | 12/2015 |
| JP | 2017-088404 A | 5/2017 |

(56) References Cited

FOREIGN PATENT DOCUMENTS

| | | |
|---|---|---|
| JP | 2017-524625 A | 8/2017 |
| KR | 20170026074 A | 3/2017 |
| NO | 317366 B1 | 10/2004 |
| NO | 20171064 A1 | 12/2018 |
| RU | 2008111257 A | 10/2009 |
| WO | 96/14258 A1 | 5/1996 |
| WO | 98/49075 A1 | 11/1998 |
| WO | 2005/077789 A1 | 8/2005 |
| WO | 2012/106746 A1 | 8/2012 |
| WO | 2014/075937 A1 | 5/2014 |
| WO | 2014/090684 A1 | 6/2014 |
| WO | 2014/195901 A1 | 12/2014 |
| WO | 2014/195902 A1 | 12/2014 |
| WO | 2015/019055 A1 | 2/2015 |
| WO | 2015/084236 A1 | 6/2015 |
| WO | 2015/118171 A1 | 8/2015 |
| WO | 2015/140216 A1 | 9/2015 |
| WO | 2015/170660 A1 | 11/2015 |
| WO | 2015193278 A1 | 12/2015 |
| WO | 2016/166323 A1 | 10/2016 |
| WO | 2016166294 A1 | 10/2016 |
| WO | 2016172793 A1 | 11/2016 |
| WO | 2016/191777 A1 | 12/2016 |
| WO | 2016/196815 A1 | 12/2016 |
| WO | 2016/198467 A1 | 12/2016 |
| WO | 2016/198565 A1 | 12/2016 |
| WO | 2017/081273 A1 | 5/2017 |
| WO | 2017/081281 A1 | 5/2017 |
| WO | 2017/121512 A1 | 7/2017 |
| WO | 2017/121515 A1 | 7/2017 |
| WO | 2017/153563 A1 | 9/2017 |
| WO | 2018/050816 A1 | 3/2018 |
| WO | 2018/053236 A1 | 3/2018 |
| WO | 2018/162757 A1 | 9/2018 |
| WO | 2018/233886 A1 | 12/2018 |
| WO | 2019/141877 A1 | 7/2019 |

OTHER PUBLICATIONS

Office Action issued in the counterpart Chinese Patent Application No. 2019800383353, dated Dec. 17, 2021 (3 pages).
Office Action issued in Chinese Application No. 2020800592135 dated Feb. 1, 2023 (21 pages).
Office Action issued in Chinese Application No. 201980037162.3; dated Sep. 27, 2021 (8 pages).
Extended European Search Report issued in European Application No. 21186410.3, dated Nov. 25, 2021 (5 pages).
United States Office Action in related U.S. Appl. No. 16/972,482, dated Mar. 22, 2022 (46 pages).
Office Action issued in the counterpart Chinese Patent Application No. 201980039066.2, dated Sep. 10, 2021 (10 pages).
Search issued in the counterpart chinese Patent Application No. 201980039066.2, dated Sep. 6, 2021 (3 pages).
Office Action in counterpart Chinese Patent Application No. 201980038106.1 dated Sep. 8, 2021 (6 pages).
Office Action in counterpart Chinese Patent Application No. 201980039693.6 dated Oct. 18, 2021 (12 pages).
Notification of Reasons for Rejection issued in Japanese Application No. 2020-568727, dated Mar. 30, 2023 (8 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
Office Action issued in counterpart Japanese Patent Application No. 2020-569128 dated Jul. 3, 2023 (6 pages).
Office Action issued in counterpart Japanese Patent Application No. 2020-568698 dated May 29, 2023 (9 pages).
Office Action issued in counterpart Japanese Patent Application No. 2020-569140 dated Jun. 2, 2023 (5 pages).
Office Action issued in counterpart Japanese Patent Application No. 2020-568714 dated Jul. 3, 2023 (16 pages).
Office Action issued in counterpart Japanese Patent Application No. 2020-568805 dated Jun. 5, 2023 (7 pages).
Office Action in counterpart Chinese Patent Application No. 201980039028.7 dated Oct. 27, 2021 (15 pages).
Office Action in counterpart Chinese Patent Application No. 201980039046.5 dated Sep. 15, 2021 (18 pages).
Office Action in counterpart Chinese Patent Application No. 201980039068.1 dated Sep. 15, 2021 (23 pages).
Office Action in counterpart Chinese Patent Application No. 201980038856.9 dated Oct. 19, 2021 (16 pages).
Office Action issued in the European Application No. 19730155.9, dated Sep. 4, 2023 (6 pages).
Office Action issued in counterpart Japanese Patent Application No. 2020-568712, dated Jun. 26, 2023 (7 pages).
International Search Report issued in International Application No. PCT/EP2019/065145 , mailed Sep. 16, 2019 (17 pages).
Written Opinion issued in International Application No. PCT/EP2019/065145, mailed Sep. 16, 2019 (8 pages).
International Preliminary Report on Patentability issued in International Application No. PCT/EP2019/065145; mailed Sep. 4, 2020 (15 pages).

* cited by examiner

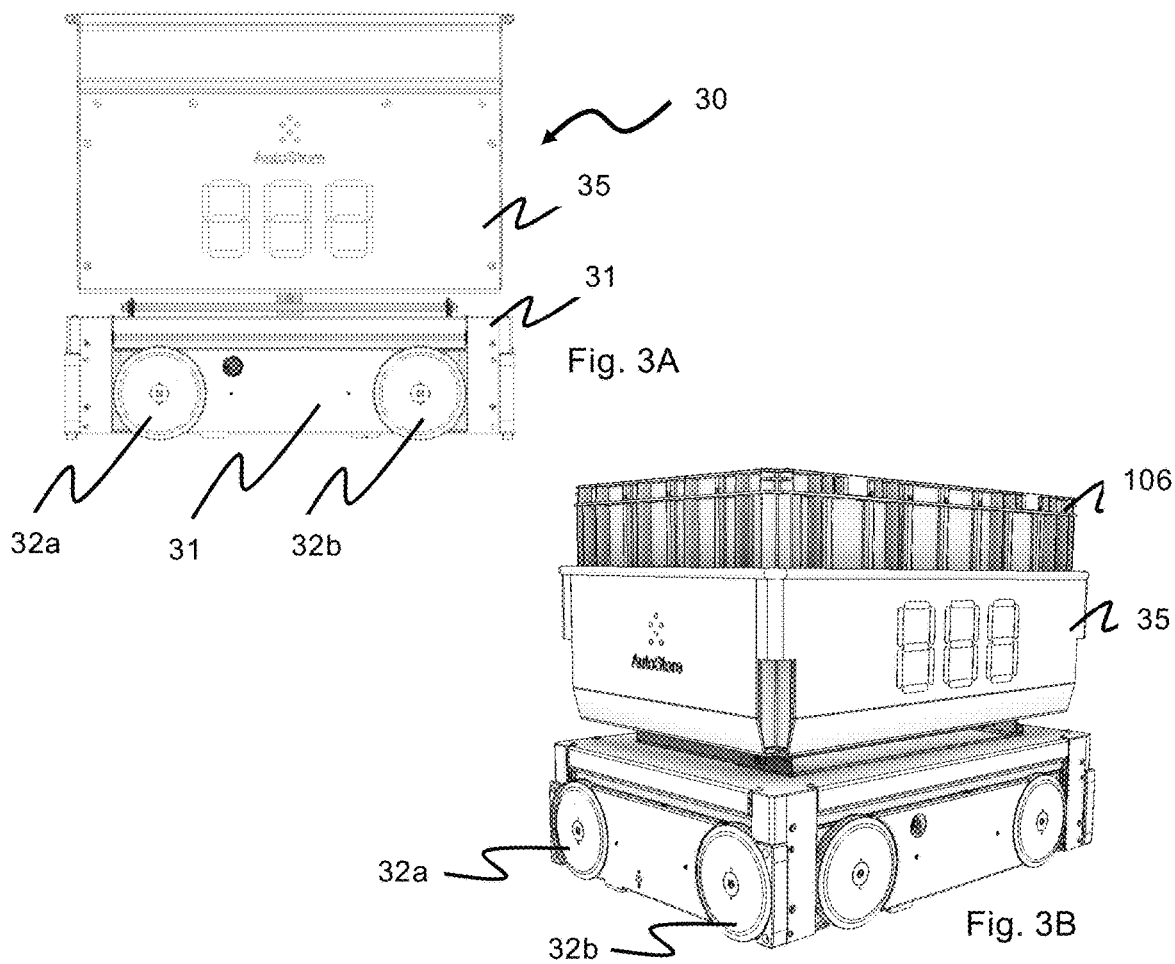
Fig. 3A
Fig. 3B
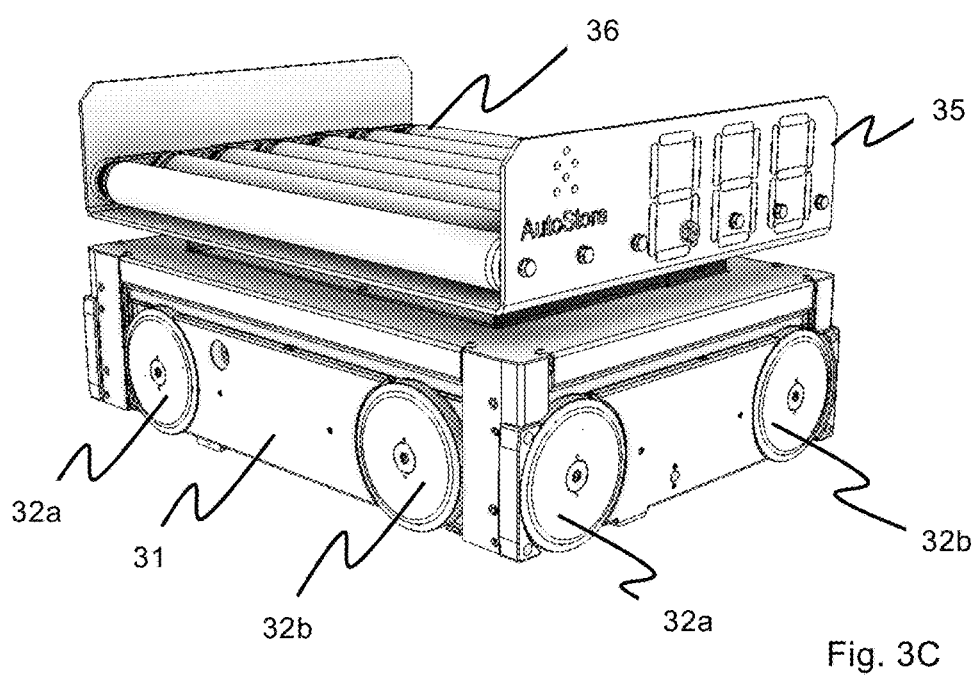
Fig. 3C

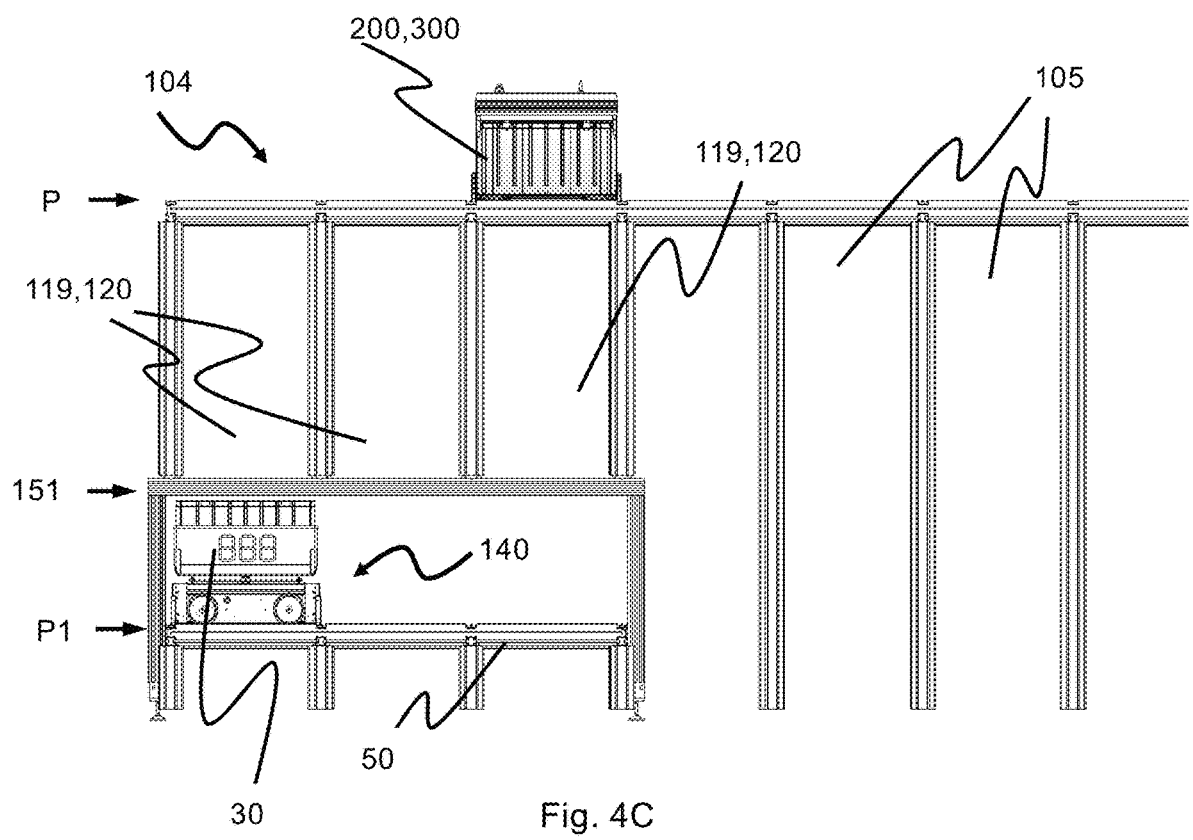

SYSTEM AND APPLICABLE METHODS OF COLLECTING ITEMS FROM STORAGE CONTAINERS USING ROBOTIC OPERATOR

The present invention relates to an automated storage and retrieval system comprising an automated storage and retrieval grid and a delivery system. The system further comprises a remotely operated delivery vehicle for transporting a storage container between an automated storage and retrieval grid and a second location. The second location comprises a robotic operator for handling of product items in the storage container. The invention is also directed to associated methods of transporting a storage container between an automated storage and retrieval grid and a second location, and where a robotic operator is arranged at the second location.

BACKGROUND AND PRIOR ART

FIGS. 1A and 1C disclose a typical prior art automated storage and retrieval system 1 with a framework structure 100. FIGS. 1B and 1D disclose prior art container handling vehicles 200,300 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. The storage grid 104 comprises multiple grid columns 112, and each grid column is defined by four of the upright members 102. A large majority of the grid columns are also termed storage columns 105, in which storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the storage containers 106 in the stacks 107, and guides vertical movement of the storage containers 106, but does normally not otherwise support the storage containers 106 when stacked. Guiding of the vertical movement of the storage containers is obtained by having the upright members 102 featuring four corner sections, wherein each corner section is arranged to accommodate a corner of a storage bin, as disclosed in for instance NO317366, WO 98/49075 and WO 2015/019055.

The automated storage and retrieval system 1 comprises a rail system 108 arranged in a grid pattern across the top of the storage grid 104, on which rail system 108 a plurality of container handling vehicles 200,300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 respectively due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column, e.g. as is disclosed in WO2014/090684A1.

The rail system 108 may be a single rail system, as is shown in FIG. 2A. Alternatively, the rail system 108 may be a double rail system, as is shown in FIG. 2B, thus allowing a container handling vehicle 201 having a footprint generally corresponding to the lateral area defined by a grid column 112 (see FIG. 2A) to travel along a row of grid columns even if another container handling vehicle 200 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space therebetween.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station, and the second delivery column 120 may comprise a dedicated pick-up port where the container handling vehicles 200,300 can pick up storage containers 106 that have been transported through the delivery column 120 from an access or a transfer station. Each of the ports of the first and second delivery column may comprise a port suitable for both pick up and drop of storage containers.

The second location may typically be a picking or a stocking station where product items are removed from or positioned into the storage containers 106. In a picking or a stocking station, the storage containers 106 are normally never removed from the automated storage and retrieval system 1, but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

A conveyor system comprising conveyors may be employed to transport the storage containers between the lower port of the delivery column and the access station (also denoted handling or picking station).

If the lower port of the delivery column and the access station are located at different levels, the conveyor system may comprise a lift device for transporting the storage containers vertically between the port and the access station.

The conveyor system may be arranged to transfer storage containers between different grids, e.g. as is described in WO2014/075937A1, the contents of which are incorporated herein by reference.

Further, WO2016/198467A1, the contents of which are incorporated herein by reference, discloses an example of a prior art access system having conveyor belts (FIGS. 5a and 5b in WO2016/198467A1) and a frame mounted rail (FIGS. 6a and 6b in WO2016/198467A1) for transporting storage containers between delivery columns and work stations where operators can access the storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105, or relocated to other storage columns 105.

A problem associated with known automated storage and retrieval systems 1 is that the area surrounding the pick-up and drop-off ports may become congested with container handling vehicles 200,300 instructed to drop off or pick up storage containers 106. This may seriously impede the operation of the automated storage and retrieval system 1. In small systems this situation may possibly be alleviated by adding delivery columns to the grid, as this will allow the container handling vehicles 200,300 to be distributed among a larger number of ports of delivery columns in order to avoid congestion. However, if ports and columns are added, the conveyor system infrastructure must normally be increased. This requires space, which may not necessarily be available. Also, adding conveyor system infrastructure is costly.

Another problem with prior art automated storage and retrieval systems 1 is that the separate drop-off ports and pick-up ports of the delivery columns 119,120 require the container handling vehicles 200,300 to move to a storage column 105 after drop-off to retrieve a new storage container 106. Likewise, the container handling vehicles 200,300 have to be empty of a storage container 106 when they are sent to a pick-up port 120 to pick up a storage container. This results in an inefficiency and causes increased congestion around the ports, as container handling vehicles 200,300 are moving around on the grid without a storage container 106 as payload. In addition, the delivery columns 119,120 may take up space on the grid 104 which could be used for other purposes such as the movement of container handling vehicles 200,300.

In view of the above, it is desirable to provide an automated storage and retrieval system, and a method for operating such a system, that solve or at least mitigate one or more of the aforementioned problem related to use of prior art storage and retrieval systems.

An objective of the invention is to provide an automated storage and retrieval system which is more effective than prior art systems by avoiding or at least reducing congestion of storage containers around the delivery column.

Another objective is to provide an automated storage and retrieval system that increases the availability of a delivery column for container handling vehicles operating on a rail system.

SUMMARY OF THE INVENTION

The invention is set forth in the independent claims and the dependent claims describe certain optional features of the invention.

The invention provides an automated storage and retrieval system comprising an automated storage and retrieval grid and a delivery system:

wherein the automated storage and retrieval grid comprises:
 a container handling vehicle rail system for guiding a plurality of container handling vehicles, the container handling vehicle rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails, the container handling vehicles being operable to retrieve a storage container from a stack of storage containers beneath the container handling rail system; and
 a delivery column adapted for transport of a storage container between a container handling vehicle and a delivery port situated at a lower end of the delivery column;
and wherein the delivery system comprises a remotely operated delivery vehicle comprising a container carrier adapted to support the storage container, the delivery vehicle being further adapted to transport the storage container between a first location represented by the delivery port and a second location, wherein the second location comprises a robotic operator for handling of product items in the storage container.

The automated storage and retrieval system may further comprise:
 a delivery rail system, where the delivery rail system comprises a first set of parallel rails arranged in a horizontal plane P1 and extending in a first direction X, and a second set of parallel rails arranged in the horizontal plane P1 and extending in a second direction Y which is orthogonal to the first direction X, and wherein the delivery rail system extends from a location below the delivery port and to the second location. The delivery vehicle may be configured to travel on the delivery rail system between a location below the delivery port and the second location.

The delivery rail system may typically be located on a ground floor level, thereby allowing easy access to the storage containers for robotic operators, and in one aspect also human. However, the delivery rail system may be located at any level below the top level of the storage grid. In a preferable configuration, the entire delivery rail system is located at a level below the pick-up and/or drop-off port of the storage grid.

In an embodiment of the storage system, the delivery rail system comprises, or is defined by, multiple horizontal ceiling profiles, vertical support profiles arranged at opposite ends of at least some of the ceiling profiles, e.g. at the opposite ends of at least some of the ceiling profiles, and the delivery system, or a section of the delivery rail system, arranged within the storage grid. The ceiling and support profiles may also be termed ceiling and support beams.

In an embodiment of the storage system, the multiple horizontal ceiling profiles provide, or are arranged as, a horizontal support grid. The horizontal support grid defines multiple support grid cells, and at least some of the support grid cells may be transfer ports through which a storage container may be transferred.

In an embodiment of the storage system, at least some of the multiple horizontal ceiling profiles may be narrower than the upright members.

In an embodiment of the storage system, each of the upright members comprises four corner sections, wherein each corner section is arranged to accommodate a corner of a storage bin.

In an embodiment of the storage system, each of the multiple delivery columns comprises a delivery port at their lower end. The delivery port may(s) be arranged at a level above the delivery rail system allowing a delivery vehicle to be positioned directly below the transfer port to receive or deliver a storage container.

The delivery system may comprise an interface connectable to a third-party storage, production and distribution system.

The delivery system may be integrable with a third-party storage, production and distribution system such that storage containers can be transported between the delivery system and the third-party storage, production and distribution system.

The delivery system of the present invention may be connectable to a third-party storage, production and distribution system such as production facility, a storage grid, assembling facility, reception or shipping location, etc. The connection may be by means of a connectable rail system or a conveyor system comprising conveyors employed to transport the storage containers between the delivery system and the third-party storage, production and distribution system.

The delivery vehicle may comprise a weighing mechanism in order to measure the weight of the storage container, for example a commercially available electronic weighing scale. Such a weighing mechanism may provide information concerning the content inside each storage container such as the total weight, the number of units, the internal weight distribution and/or the location within the storage grid the storage container should be placed.

The at least one delivery column is preferably arranged such that a container handling vehicle may lower a storage container from the top rail grid, via the delivery column, to a delivery vehicle arranged below the delivery column. Consequently, the lower end of the delivery column has an opening, i.e. a transfer port, allowing the storage container to enter the delivery rail system from above.

To get the most storage space for storage containers in the storage and retrieval grid, it may be advantageous to arrange the delivery rails system such that it extends as little as possible into the storage grid. That means that the storage and retrieval grid may comprise a plurality of storage columns extending from the upper level to the base of the storage grid, thus allowing the greatest possible storage capacity since the entire storage column may be used for storage.

In order to maintain greatest possible storage capacity, the part of the delivery rail system extending into the storage grid may be kept as small (little extent) as possible. Thus, the delivery rail system and the delivery vehicle may occupy as little space as possible of the storage and retrieval grid, the space which may be used for storage of storage containers.

The delivery rail system may comprise a first rail system located within the framework structure of the storage grid, and a second rail system located outside the framework structure of the storage grid, and wherein the first and second rail system are connected such that the delivery vehicle may operate between said rail systems. The second location may be connected to the second rail system.

The automated storage and retrieval system may further comprise a gantry arrangement above the delivery vehicle, and the robotic operator may be in the form of at least one robot arm suspended from the gantry arrangement. The robotic operator suspended from the gantry arrangement may be any suitable device for picking product items from a storage container.

Alternatively, or additionally, floor based, base mounted and/or delivery rail mounted robot arm(s) may be employed in combination with gantry arrangement suspended robot arms.

The gantry arrangement may span over at least parts of the delivery rail system and the at least one robot arm may be configured to move in the XYZ directions (e.g. to move in all directions) to access storage containers at different locations on the delivery system/delivery rail system. Whether or not the robotic operator itself is configured to travel, it may still be operable to pick and place product items from storage containers in multiple locations in the delivery system.

At least a part of the gantry arrangement may be laterally offset from the delivery rail system and the at least one robot arm may be configured to travel laterally along the gantry arrangement in order to insert product items into or remove product items from, a third location outside the delivery rail system.

At least a part of the gantry arrangement may be laterally offset from the delivery rail system and the at least one robot arm may be configured to deliver the at least one product item to, or retrieve at least one product item from, a third location outside the delivery rail system by varying extension of robot arm length.

Thus, as an alternative to lateral travel, a robot arm or robotic operator with sufficient reach may be provided to move product item(s).

The third location may be a temporary position for storing a plurality of product items and the at least one robot arm may be configured to deliver the at least one product item to the temporary position.

The third location may be a transport container for storing one or more product items and the robot arm may deliver the at least one product item to the transport container for further transportation.

The third location may be a temporary position for storing of a plurality of product items.

The robotic operator may be in the form of at least one robot arm supported on a floor base, a base above the delivery rail system or on the delivery rail system.

The at least one robot arm, either gantry mounted or supported on a floor base, a base above the delivery rail system or on the delivery rail system, may be configured to be moved in the XYZ directions to access storage containers at different locations within the delivery rail system and transfer the at least one product item between storage container(s) within the delivery rail system and/or into an item carrier on a consolidation vehicle and/or a third location outside the delivery rail system. The third location may be any of the third locations described above.

The invention further provides a method of transporting a storage container between an automated storage and retrieval grid and a second location for handling a product item in the storage container by a robotic operator, the automated storage and retrieval grid comprising:
    a container handling vehicle rail system for guiding a plurality of container handling vehicles, the container handling vehicle rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails, the container handling vehicles being operable to retrieve a storage container from a stack of storage containers beneath the container handling rail system; and a delivery column adapted for transport of a storage container between a container handling vehicle and a delivery port situated at a lower end of the delivery column;

wherein the method comprises the steps of:

lowering the storage container through the at least one delivery column to a first location represented by the delivery port;

positioning a remotely operated delivery vehicle below the delivery port and receiving a storage container onto a container carrier provided on the remotely operated delivery vehicle; and transporting the storage container to the second location using the remotely operated delivery vehicle;

using at least one robotic operator to pick at least one product item from the storage container at the second location.

The method may further comprise the steps of:

operating the remotely operated delivery vehicle to return to the delivery port, which may comprise operating a rolling device of the remotely operated delivery vehicle; and lifting the storage container from the delivery vehicle and through at least one delivery column for storage of the storage container in the automated storage and retrieval grid. The delivery column through which the storage container is returned to the storage and retrieval grid may be the same as the delivery column it was previously dispensed from, or may be another delivery column e.g. which is used only for storage containers returning to the storage and retrieval grid.

The method may further comprise the step of:

utilizing a robotic operator in the form of at least one robot arm suspended from a gantry arrangement above the delivery vehicle.

The gantry arrangement may span over at least a part of a delivery rail system on which the delivery vehicle operates and the method may further comprise the step of:

operating the at least one robot arm to move in the XYZ directions thereby allowing access to storage containers at different locations within the delivery rail system.

At least a part of the gantry arrangement may be laterally offset from the delivery rail system and the method may further comprise the step of:

operating the at least one robot arm to travel laterally along the gantry arrangement for product item insertion into, or removal from, a third location outside the delivery rail system.

The method may further comprise:

utilizing a robotic operator in the form of at least one robot arm supported on a floor base, on a base above a delivery rail system on which the delivery vehicle operates, on a delivery rail system on which the delivery vehicle operates.

The method may further comprise:

moving the at least one robot arm in the XYZ directions to access storage containers at different locations within the delivery rail system and transferring the at least one product item between the storage container within the delivery rail system and a third location outside the delivery rail system.

The third location may be a transport container for storing one or more product items and the method may comprise operating the at least one robot arm for delivery of the at least one product item to the transport container for further transportation.

The invention further provides a method of transferring at least one product item between an automated storage and retrieval grid and a second location, the automated storage and retrieval grid comprising:

a container handling vehicle rail system for guiding a plurality of container handling vehicles, the container handling vehicle rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails, the container handling vehicles being operable to retrieve a storage container from a stack of storage containers beneath the container handling rail system; and a delivery column adapted for transport of a storage container between a container handling vehicle and a delivery port situated at a lower end of the delivery column;

wherein the method comprises the steps of:

positioning a remotely operated delivery vehicle with a storage container to be filled at the second location;

using at least one robotic operator for placing at least one product item into the storage container;

using the remotely operated delivery vehicle to bring the storage container below a delivery port operating a container handling vehicle to retrieve the storage container from the remotely operated delivery vehicle through the at least one delivery column.

The remotely operated delivery vehicle may operate a rolling device to bring the storage container below a delivery port.

The system may comprise a plurality of stacks of storage containers arranged in storage columns located beneath the rail system, wherein each storage column is located vertically below a grid opening, and a plurality of container handling vehicles for lifting and moving storage containers stacked in the stacks, each container handling vehicle being configured to move on the rail system above the storage columns.

The delivery rail system may comprise a first set of parallel rails arranged in a horizontal plane and extending in a first direction, and a second set of parallel rails arranged in the horizontal plane and extending in a second direction which is orthogonal to the first direction.

Each of the robotic operators according to the invention are able to reach multiple positions within the delivery system. This fact, i.e. that the robotic operator is able to access multiple locations within the delivery system completely removes, or at least minimizes, the need for an access port in accordance with prior art solutions. The robotic operator, e.g. either gantry mounted or base mounted on the delivery rail system or next to the delivery system, may move to access storage containers transported on remotely operated delivery vehicles at different locations within the delivery system. For example, in known conveyor systems storage containers are only accessible by any given robot at one point on the conveyor.

The third location may be at the robotic operator, e.g. in systems where more than one robotic operator is used, one or more of the robotic operators may serve as a temporary storage position for a product item e.g. until other product item(s) being sent to e.g. the same client are picked.

The disclosed system and methods may have additional advantages over prior art in that traditional conveyor systems are not only expensive, but also represent a single point of failure—the remotely operated delivery vehicles are able to avoid obstacles such as robotic operators waiting for a container or a malfunctioning robotic operator by altering their routing, or if a malfunction delivery vehicle is within the delivery system, the robotic operator may access the product item in a storage container transported by the malfunctioning delivery vehicle. The latter is made possible because the whole delivery rail system may serve as a conventional port provided that at least one of the robotic operators can access any position of the delivery rail system. Contingency problems which can occur in conventional ports are thus avoided.

The delivery vehicles may function in a similar way to the internet, conveying their packages between 'nodes' along a route which can be altered as necessary without bumping into each other due to the double track rail layout of the delivery rail and the single grid cell size, all the while being accessible by robotic operators. Furthermore, different parts of the delivery rail system may be allocated to storage containers with different types product items (e.g. chilled, long-life, fresh, etc.), so that different robotic operators (or common robotic operators) may be allocated to the different parts of the delivery rail system.

The robotic operators can select product items of different types depending on product item. For example, a storage container with chilled items may be allocated to a part of the delivery rail system with cooling and the robotic operator may be instructed to pick said chilled item close to completion of a specific order. On the contrary, storage containers with product items that are not temperature sensitive, may be picked as one of the first items in a specific order.

According to a further aspect of the invention, or in addition to the foregoing, the robotic operator(s) may be configured to re-organize or re-arrange product item(s) within a storage container, and/or move product item(s) between storage containers e.g. storage containers carried by delivery vehicles as described herein. The robotic operator(s) may be configured to transfer product items between storage containers carried by delivery vehicles prior to storage of at least one of the storage container, and/or prior to at least one of the storage containers being presented for picking of product items therein. Therefore, the robotic operators may be configured to organize product items in the storage and retrieval system, and/or may be used to cultivate the contents of storage containers e.g. before the storage containers are presented for selection of product items therein e.g. for delivery or the like. This may be advantageous for example in the event that one storage container is almost empty and that the remaining item(s) is moved to another storage container with the same product item(s).

Such a move may be performed by a robot arm which could pick up a product item from a storage container in a first remotely operated delivery vehicle, a second remotely operated delivery vehicle with a storage container could replace the first remotely operated delivery vehicle, and the arm could place the product item in the storage container in the second remotely operated delivery vehicle. The robot arm could also transfer product items between neighboring or near-by delivery vehicles or storage containers, e.g. without the delivery vehicles moving during the transfer.

Furthermore, or alternatively, a robotic operator may move all product item(s) from one container into another, for example combining partially empty storage containers to make a full container and a spare empty container. Conversely, the robotic operators could evenly distribute product items from a container to ensure multiple storage containers have the needed product item, increasing access efficiency for that product item type. In this latter solution, the second location and/or third location may be a storage container on another remotely operated delivery vehicle. The second and/or third location may in this setup be referred to as an item picking area.

Furthermore, a robotic operator may move product item(s) from one or more storage containers into an item carrier on a consolidation vehicle for finishing or partly finishing product orders before presenting at the handling or picking station or to an item consolidating area.

The consolidation vehicle may be movable both in X and Y directions on the delivery rail system, including to locations on the delivery rail system where the robotic operators can place or pick product items into or out of the item carrier on the consolidation vehicle. Such a location on the delivery rail system can be denoted an item picking area. The item carrier may comprise four sidewalls, a bottom section and an open top, wherein one of the sidewalls or the bottom section can be openable, such that the product items may be emptied from the item carrier in a horizontal or vertical direction, respectively. When the consolidation vehicle is transported to an item consolidation area, which is an area where the consolidation vehicle may be positioned to deliver the product items stored in the item carrier, it may emptied to a packaging/processing assembly where product orders are finalized and prepared for shipment.

In an embodiment, one of the sidewalls or the bottom section of the consolidation vehicle may be connected to an actuator such that the sidewall or bottom section may be opened and closed by activating the actuator. In other words, the openable sidewall or bottom section provides an opening in the item carrier when the openable sidewall or bottom section is in an open position. Alternatively, one of the sidewalls or bottom section is made up of, or comprises, at least one actuated surface.

Furthermore, a robotic operator may also be used as part of a process of re-organization of product item(s) in a storage container before the storage container with product item(s) is presented to an operator at a picking station. The product items in the storage container may have been picked by robotic operator(s) or the storage container may come directly from a stack of storage containers beneath the container handling vehicle rail system. Then an operator at a picking station may only need to confirm storage container contents before the storage container is prepared for further transport or shipment. In case the product item(s) are disorderly arranged within the storage container, a robotic operator may be utilized to systemize or re-organize the product item(s) in an intermediate pre-picking stage such that when the storage container arrives at the picking station the product item(s) are automatically organized such that all of them are visible from above by a human operator or a camera (the operator may then be at another location and simply confirm the content in the storage container by controlling snapshot(s) taken by the camera of the product item(s) within the storage container).

Such a method may include the steps of, after the storage container has been transported the second location by the delivery vehicle, to pick at least one product item in the storage container by the robotic operator and automatically place the picked product item into the same storage container such as to re-organize product item(s) in the storage container.

Furthermore, the robotic operator may also be used as part of a process of re-organizing product item(s) of different category/ies stored in one common storage container to a plurality of other storage containers, e.g. one storage container for each of the different product categories. For example, one storage container may comprise a variety of medicines from one medicine provider and may be stored in the automated storage and retrieval grid. Then the automated storage and retrieval system may, whenever it has time and capacity, bring this storage container with different medicines to the robotic operator(s) at the second location such that the robotic operator(s) can place one type of medicine in respective storage containers. Such a method may include the steps of, after the storage container has been transported the second location by the delivery vehicle, to pick at least one product item from the storage container by the robotic operator and placing the picked product item in another respective storage container.

It is further described a method of consolidating multiple items in an automated storage and retrieval grid and a second location, the automated storage and retrieval grid comprising:
a container handling vehicle rail system for guiding a plurality of container handling vehicles, the container handling vehicle rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails, the container handling vehicles being operable to retrieve a storage container from a stack of storage containers beneath the container handling rail system; and
a delivery column adapted for transport of a storage container between a container handling vehicle and a delivery port situated at a lower end of the delivery column;
wherein the method comprises the steps of:
positioning a remotely operated delivery vehicle with a first storage container at the second location;
positioning a consolidation vehicle with an item carrier at the second location;
using at least one robotic operator for transferring at least one product item from the storage container carried by the remotely operated delivery vehicle into the item carrier;
transferring a second product item from the first storage container, or from a second storage container carried by another remotely operated delivery vehicle, into the item carrier of the consolidation vehicle by using the robotic operator;
moving the consolidation vehicle to a consolidation area on the delivery rail system of the transfer rail grid; and
opening a openable sidewall or bottom section the consolidation vehicle, such that the first and second items are emptied from the item carrier in a horizontal or vertical direction.

BRIEF DESCRIPTION OF THE DRAWINGS

The following drawings depict alternatives of the present invention and are appended to facilitate the understanding of the invention. However, the features disclosed in the drawings are for illustrative purposes only and shall not be interpreted in a limiting sense.

FIG. 1 A-D are perspectives view of a prior art automated storage and retrieval system, where

FIG. 2A shows a single track system, FIG. 2B shows a double track system and FIG. 2C shows a double track system indicated width and length of a container handling vehicle grid cell.

FIG. 3 A is a side view of a remotely operated delivery vehicle.

FIG. 3B is a perspective view of a remotely operated delivery vehicle having a container carrier with a compartment for holding a storage container.

FIG. 3C is a perspective view of a remotely operated delivery vehicle having a container carrier provided with conveyors.

DETAILED DESCRIPTION OF THE INVENTION

Figure 1A:
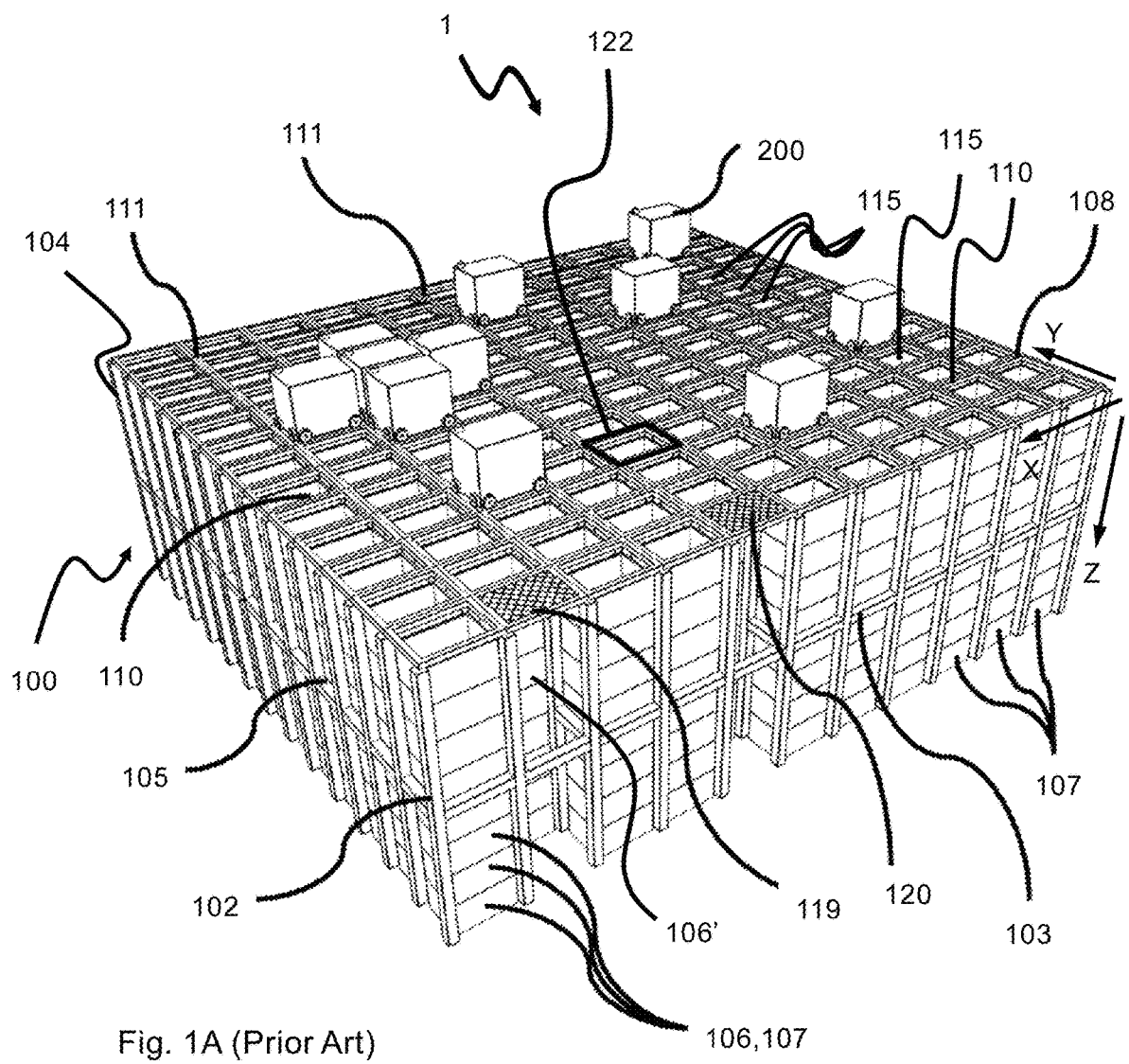
FIG. 1A and FIG. 1C show the complete system and FIG. 1B and FIG. 1D show examples of system operable prior art container handling vehicles.
Figure 1B:
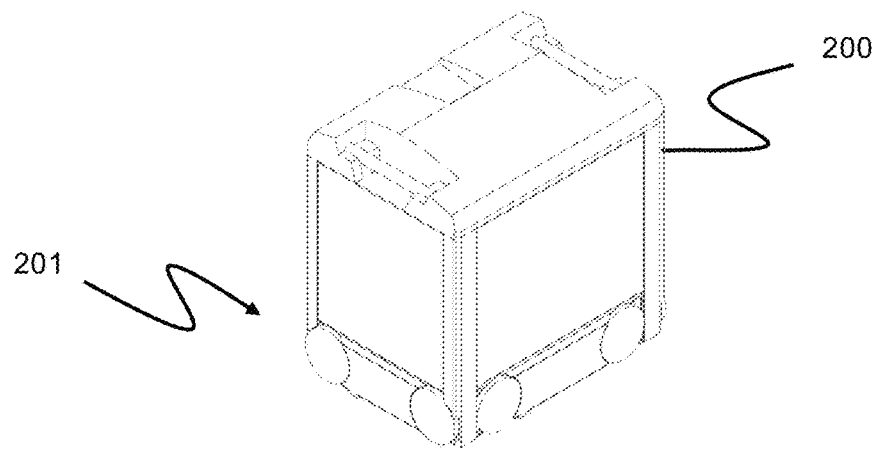

In the following, different alternatives will be discussed in more detail with reference to the appended drawings. It should be understood, however, that the drawings are not intended to limit the scope of the invention to the subject-matter depicted in the drawings. Furthermore, even if some of the features are described in relation to the system only, it is apparent that they are valid for the methods as well, and vice versa.

With reference to FIGS. 1A-D the storage grid 104 of each storage structure 1 constitutes a framework 100 of in total 143 grid columns 112 (see grid column 112 in top front corner, i.e. grid location or cell X=11, Y=1, Z=0), where the width and length of the framework corresponds to the width and length of 13 and 11 grid columns 112, respectively. The top layer of the framework 100 is a container handling vehicle rail system/rail system 108 onto which a plurality of container handling vehicles 200,300 are operated.

Figure 1C:
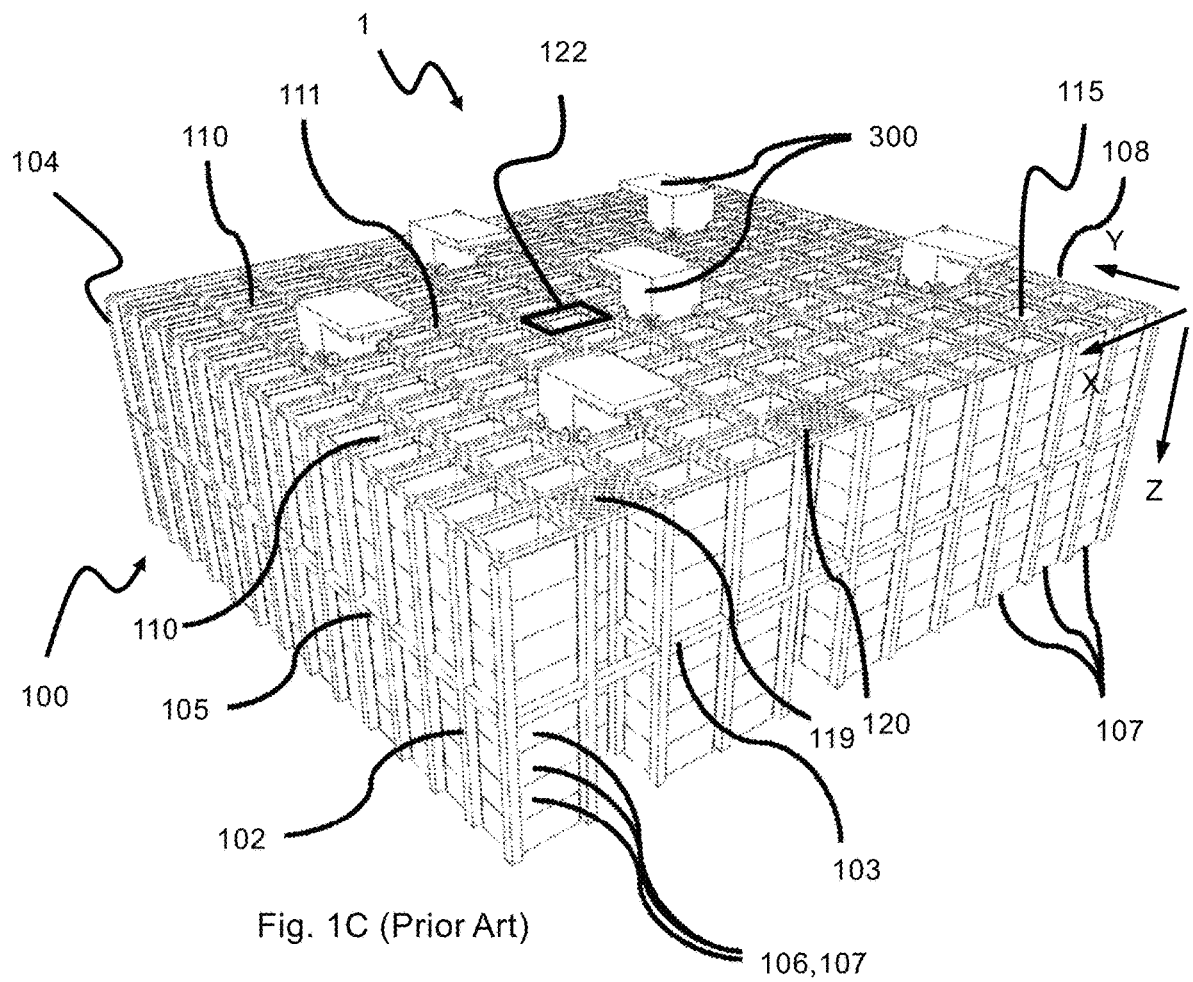
Figure 1D:
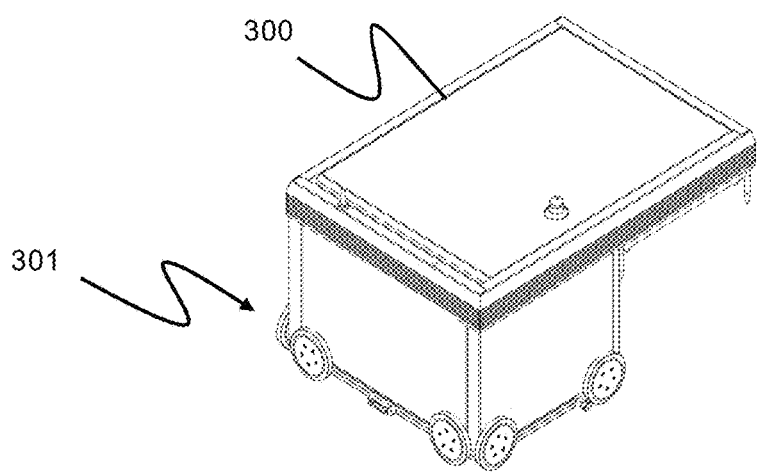

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes a container handling vehicle rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIGS. 2A-2C). In FIGS. 1A and 1C, such a grid cell 122 is marked on the rail system 108 by thick lines. To guide the vertical movement of the storage containers, each of the upright members 102 has a cross-section featuring four corner sections, wherein each corner section is arranged to accommodate a corner of a storage container 106.

The container handling vehicle rail system 108 allows the container handling vehicles 200,300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122, or any size in between these examples, e.g. 100×100 grid cells, 200×200 grid cells, 500×500 grid cells etc. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

Figure 2A:
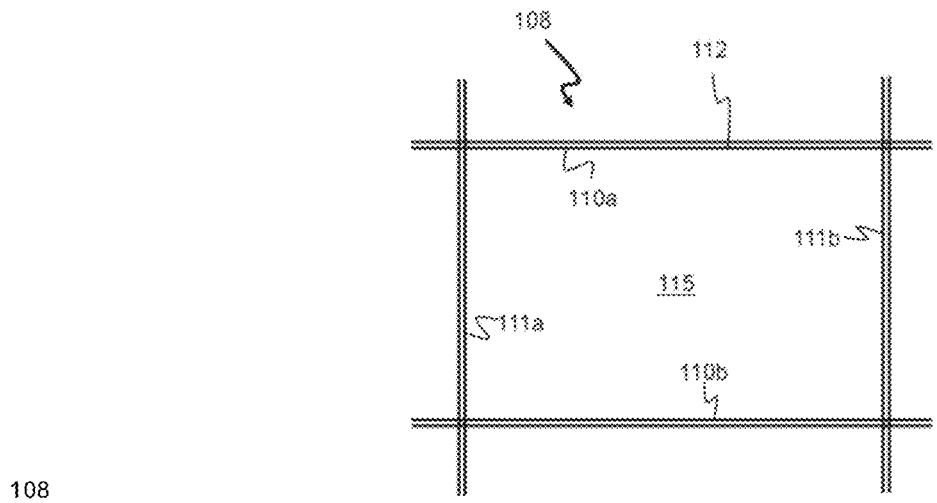
FIG. 2A-C is a top view of a container handling vehicle rail system, where
Figure 2B:
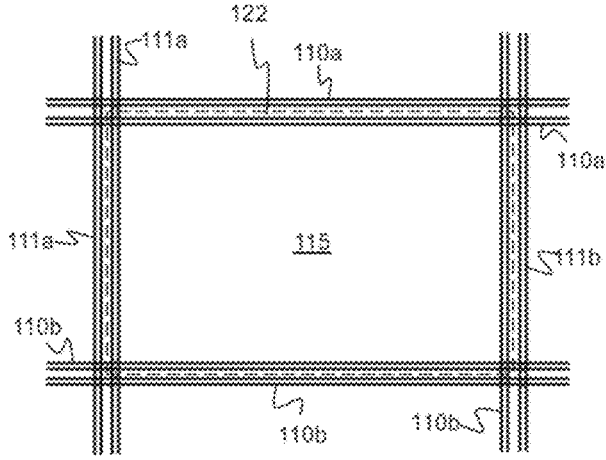
Figure 2C:
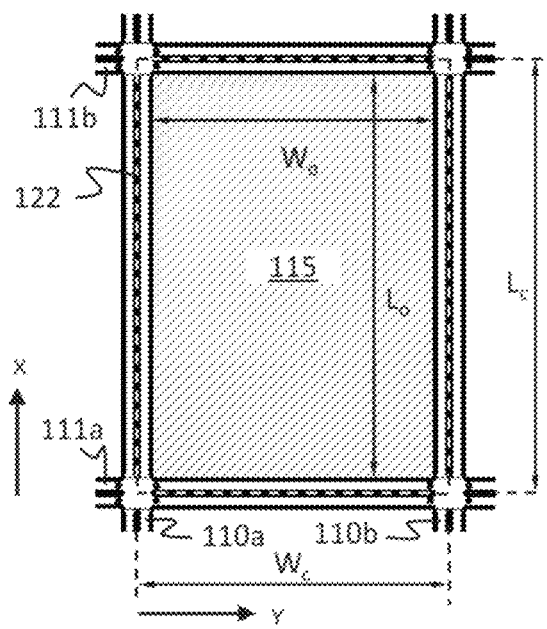

The rail system 108 may be a single rail system, as is shown in FIG. 2A. Alternatively, the rail system 108 may be a double rail system, as is shown in FIG. 2B. Details of the single and double rail systems are disclosed in this specification under the section of background and prior art.

FIG. 3A shows a remotely operated delivery vehicle 30, hereinafter referred to as a delivery vehicle 30.

The delivery vehicle 30 is configured for transport of one or more storage containers 106 (not shown) between an automated storage and retrieval grid 104 (not shown) configured to store a plurality of stacks 107 of storage containers 106, hereinafter referred to as a storage grid 104, and a second location. The second location comprises a robotic operator 160 for handling items in the storage container 106. There may be several robotic operators or there may be robotic operators in combination with one or more human operators 164 (see e.g. FIGS. 6A-6C). The delivery vehicle 30 may be configured for transport of only one storage container 106, or may be configured for transport of more than one storage containers simultaneously.

With reference to FIGS. 3A-3D, said delivery vehicle 30 comprises; a vehicle body 31, rolling devices 32 connected to the vehicle body 31, rolling device motors (not shown) for driving the rolling devices 32 in a horizontal plane P1, and a power source (not shown) connected to the rolling device motor(s). The power source should provide sufficient power to the rolling device motor to propel the rolling device 32 over a set route from the storage grid 104, for example to the second location.

The delivery vehicle 30 may further comprise a container carrier 35 mounted above the vehicle body 31. The container carrier 35 should be configured to receive the storage container 106 onto or within the container carrier 35 such that the storage container 106 is hindered to move relative to the container carrier in the horizontal direction.

The container carrier 35 may comprise a container supporting device supporting the storage container 106 from below.

In FIG. 3 A the container carrier 35 is disclosed in the form of a storage container receiving compartment having a bottom/base and side walls. The volume of the compartment is in this exemplary configuration such that it may receive and contain the entire horizontal extent of the storage container and at least a part of the vertical extent of the storage container. FIGS. 3A and 3B show examples of container carriers 35 containing an entire storage container 106 and FIG. 3B shows an alternative container carrier 35 containing a part of the storage container 106, whereas FIG. 3C shows another alternative where the delivery vehicle 30 has a container carrier 35 provided with conveyors 36.

The particular configuration of the container carrier 35 disclosed in FIG. 3A allows the delivery vehicle 30 to transport a storage container 106 having different heights.

Note that the size of the compartment within the container carrier 35 may easily be adapted for receiving and supporting a multiple number of storage containers 106 in one operation.

Figure 3D:
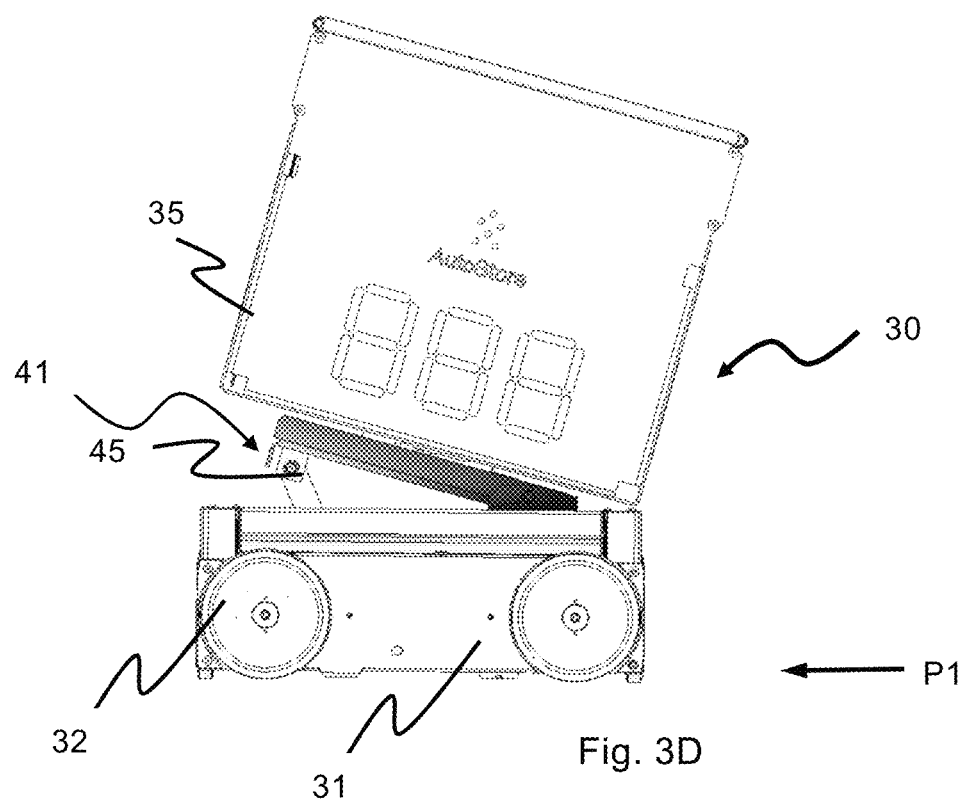
FIG. 3D is a is a perspective view of a remotely operated delivery vehicle where the container carrier may be set in a tilted position relative to the vehicle body.

FIG. 3D shows an alternative configuration of the delivery vehicle 30, where the container carrier 35 may be moved into a tilted position relative to the vehicle body 31 and the horizontal plane P1. The container carrier 35 may be tilted by means of a dedicated displacement device, e.g. tilt motor 41. The tilting may be around a pivot axis directed in the principal moving direction of the delivery vehicle 30. If the delivery vehicle 30 is moving on perpendicular rails (see below), these principal directions would be in either the X direction or the Y direction.

The tilting of the displacement device may for example be obtained by a lifting arm 45 coupled to the vehicle body 31 and the container carrier 35. Further, the lifting arm 45 may be driven by a dedicated tilt motor (not shown) or the rolling device motor or both.

If used on a delivery rail system 50 (see FIGS. 4A, 4B, 4C, 5, 6A-6C, 7A-7B, 8A-8B) one of both sets of wheels 32a, 32b of the rolling device 32 should be lifted and lowered so that the first set of wheels 32a and/or the second set of wheels 32b can be engaged with the respective set of rails provided on the delivery rail system 50 any one time.

FIG. 3B shows another alternative of a remotely operated delivery vehicle 30. Similar to the container carrier 35 described above, the container carrier 35 of this configuration is a container supporting device for supporting the storage container 106 from below.

The container supporting device hence comprises a base plate provided with side walls along the outer circumference or periphery of the base plate, thereby defining a compartment. The horizontal extent of the compartment is adapted to be large enough to receive one or more storage containers 106 and small enough to substantially hinder movements of the one or more storage containers 106 when inserted. However, in contrast to the exemplary configuration of the delivery vehicle 30 shown in FIG. 3A, the one or more side wall of the container supporting device in FIG. 3B has a vertical height less than the vertical height of each storage container 106. In fact, in order to achieve the purpose of the side walls of the container carrier 35 (to substantially prevent horizontal movement when inserted) it is sufficient with only a small vertical protrusion upwards from the base plate, for example less than 5% of the height of the side walls of the storage container 106.

FIG. 3C shows yet another exemplary configuration of the remotely operated delivery vehicle 30. In this configuration the container carrier 35 comprises a base plate, a conveyor 36 with rollers arranged on the base plate and two parallel side walls protruding upwards from the base plate. The rolling device 32 and the vehicle body 31 are the same as or similar to the rolling device 32 and the vehicle body 31 described above in connection with FIGS. 3A and 3B.

The conveyor 36 may be set up by a plurality of parallel oriented rollers having a common longitudinal direction perpendicular to the two side walls. In this way the rollers allow one or more storage containers 106 to be shifted into or off the container carrier 35 while being guided by the side walls. The conveyor may be connected to a conveyor motor (not shown) driving rotation of one or more of the rollers.

Alternatively, the side walls are omitted, allowing the storage containers 106 to have a horizontal offset relative to a vertical center plane oriented perpendicular to the longitudinal direction of the rollers. Hence, the storage containers 106 may be arranged such that it extends beyond the end of the rollers in the longitudinal direction of the rollers.

In yet another alternative configuration, the conveyor may comprise a plurality of rolling balls within or on the base plate of the container carrier 35 allowing the one or more storage containers 106 to roll on top of the balls. With this configuration, and with no side walls present, the storage container 106 may be moved in any direction above the base plate.

Figure 4A:
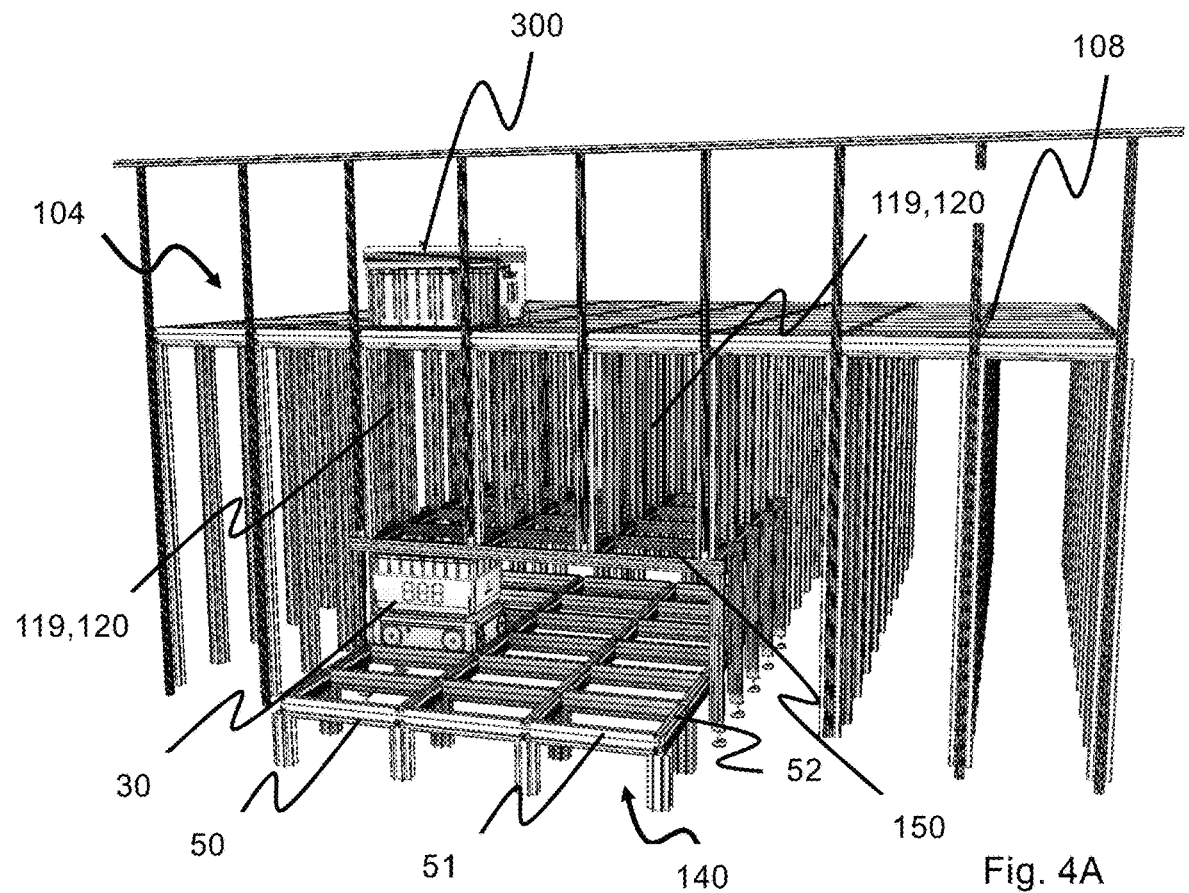
FIG. 4 A-B is a perspective view of an automated storage and retrieval grid and a delivery system (robotic operator not shown).
FIG. 4C shows a side view of an automated storage and retrieval system comprising an automated storage and retrieval grid and a delivery system (robotic operator not shown).
Figure 4B:
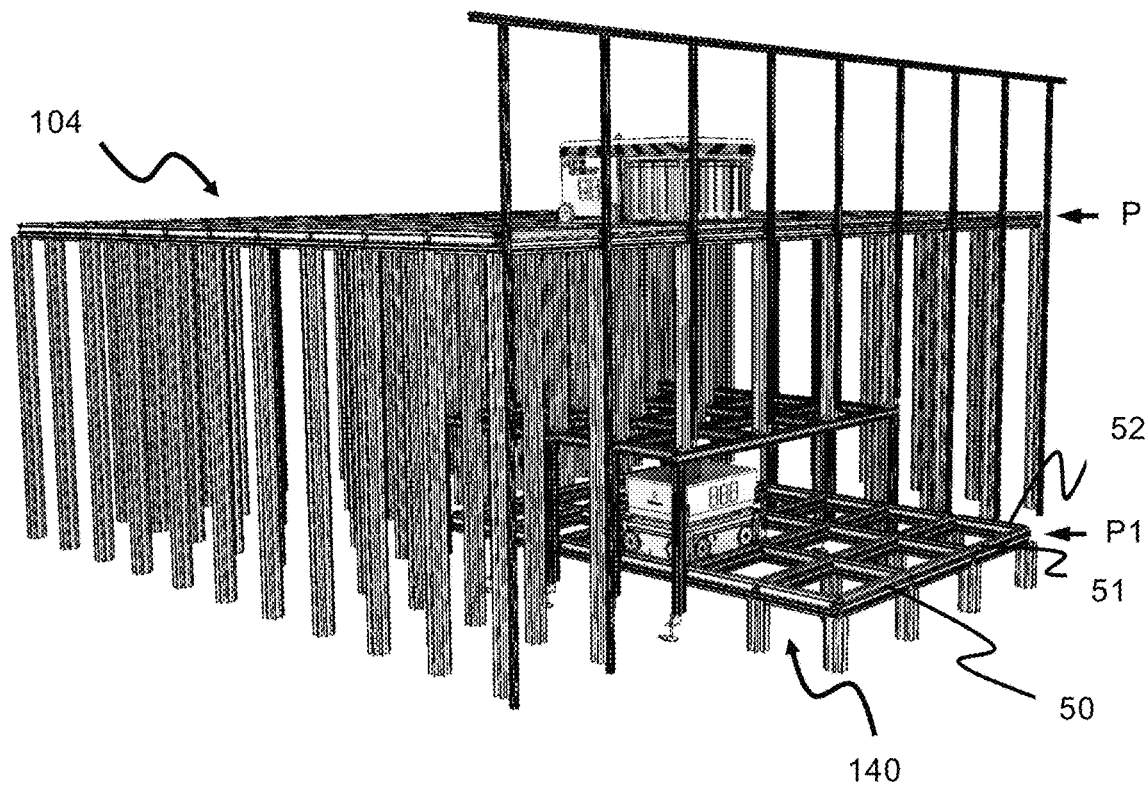

FIGS. 4A, 4B and 4C are perspective views of an automated storage and retrieval system without a robotic operator. The system comprises storage grid 104 and a delivery system 140 including the above described delivery vehicle 30. The delivery system 140 defines multiple grid cells delivery rail system 122' (see FIG. 9B), and at least some of the grid cells delivery rail system 122' are delivery ports 119,120 through which a storage container 106, may be transferred.

The storage grid 104 is the same as or similar to the prior art storage grid 104 as described above in relation to FIGS. 1A-C, i.e. a storage grid 104 comprising a rail system 108; a plurality of stacks 107 of storage containers 106, a plurality of container handling vehicles 300 for lifting and moving storage containers 106 stacked in the stacks 107 (not shown in FIGS. 4A and 4B) and a delivery column 119,120 configured to receive a storage container 106 from a container handling vehicle 200,300.

The rail system 108 comprises a first set of parallel rails 110 arranged in a horizontal plane P and extending in a first direction X and a second set of parallel rails 111 arranged in the horizontal plane P and extending in a second direction Y which is orthogonal to the first direction X. The first and second sets of rails 110, 111 form a grid pattern in the horizontal plane P comprising a plurality of adjacent grid cells 122. Each grid cell 122 comprises a grid opening defined by a pair of neighboring rails of the first set of rails 110 and a pair of neighboring rails of the second set of rails 111.

The plurality of stacks 107 are arranged in storage columns 105 located beneath the rail system 108, wherein each storage column 105 is located vertically below a grid cell 122.

Each container handling vehicle 200,300 is configured to move on the rail system 108 above the storage columns 105.

Further, the delivery system 140 comprises one or more of the delivery vehicles 30 as described above, i.e. delivery vehicles 30 configured to receive and support one or more storage containers 106 for transport between one or more delivery columns 119,120 and one or more predetermined positions outside the storage grid 104. The predetermined positions may for example be a second location or a conveyor line or a transport vehicle such as a truck.

The delivery system 140 may further comprise a delivery rail system 50 situated below a delivery port 150 of the one or more delivery columns 119,120.

As shown in FIGS. 4A-B, the delivery rail system 50 may be constructed in the same way or a similar way as the rail system 108 for the container handling vehicles 200,300.

Hence, the delivery rail system 50 may comprise a first set of parallel rails 51 arranged in a horizontal plane P1 and extending in a first direction X, and a second set of parallel rails 52 arranged in the horizontal plane P1 and extending in a second direction Y which is orthogonal to the first direction X.

The delivery rail system 50 may also be a double rail system, as is shown in FIG. 2B, thus allowing a remotely operated delivery vehicle 30 having a footprint generally corresponding to the lateral area defined by a delivery grid column to travel along a row of grid columns even if another delivery vehicle 30 is positioned above a grid column neighboring that row.

Both the single and double rail system, or a combination comprising a single and double rail arrangement in a single rail system, forms a grid pattern in the horizontal plane P1 comprising a plurality of rectangular and uniform grid locations or grid cells, where each grid cell comprises a grid opening being delimited by a pair of rails of the first rails and a pair of rails of the second set of rails.

The pair of rails in the X-direction defines parallel rows of delivery grid cells running in the X direction, and the pairs of rails in the Y direction defines parallel rows of delivery grid cells running in the Y direction.

Accordingly, each delivery grid cell has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the delivery grid cell.

The delivery rail system 50 can be fully or partly integrated into the storage grid 104. However, it is considered advantageous for ensuring an effective operation that the delivery rail system 50 has a horizontal extent that serves a delivery port 150 (see FIG. 4A) below at least one of the delivery columns 119,120.

FIGS. 4A and B show a delivery rail system 50 extending from a location inside the storage grid 104 to a location outside the storage grid 104. One or more second locations, e.g. a structure for picking and placing product items in the storage containers 106, may be arranged anywhere at the delivery rail system 50 located outside the storage grid 104. Alternatively, or in addition, a conveyor may be arranged at or near the same periphery of the delivery rail system 50.

FIG. 4C shows a side view of the automated storage and retrieval system comprising an automated storage and retrieval grid 104 and a delivery system 140. The delivery system 140 comprises a delivery vehicle 30 adapted to move on a delivery rail system 50 located below a delivery port 150 (not in FIG. 4C, see FIG. 4A or 4B) of a delivery column 119,120 of a storage grid 104. A container handling vehicle 200,300 operates on a rail system 108 for pick-up and drop-off of storage containers through the delivery column 119,120. The delivery vehicle 30 is operated such that it can receive or deliver a storage container 106 to the delivery port 150. The container storage columns 105 are shown in FIG. 4C containing no storage containers 106. In operation, the storage columns 105 are filled with storage containers 106 stacked one on top of another.

The delivery system may benefit from many of the considerations provided for the container handling vehicle rail system 108 and the container handling vehicles 200,300 of the storage grid 104. As shown in FIG. 4C the upright members 102 of the storage grid 104 are finished short and suspended on a mezzanine level 151 which itself has upright posts that may be stepped out from the delivery columns 119,120. Consequently, the adoption of the delivery system 140 means a loss of storage space in the storage grid 104. However, the benefit is increased delivery efficiency of storage containers 106 in the automated storage and retrieval system, since the congestion of the storage containers 106 at the delivery columns 119,120 is avoided or at least reduced. The number of delivery columns 119,120 and the size of the mezzanine (its extent) in the X and Y direction may be customized according to the size of the storage system and the desired efficiency of the system.

Figure 5:
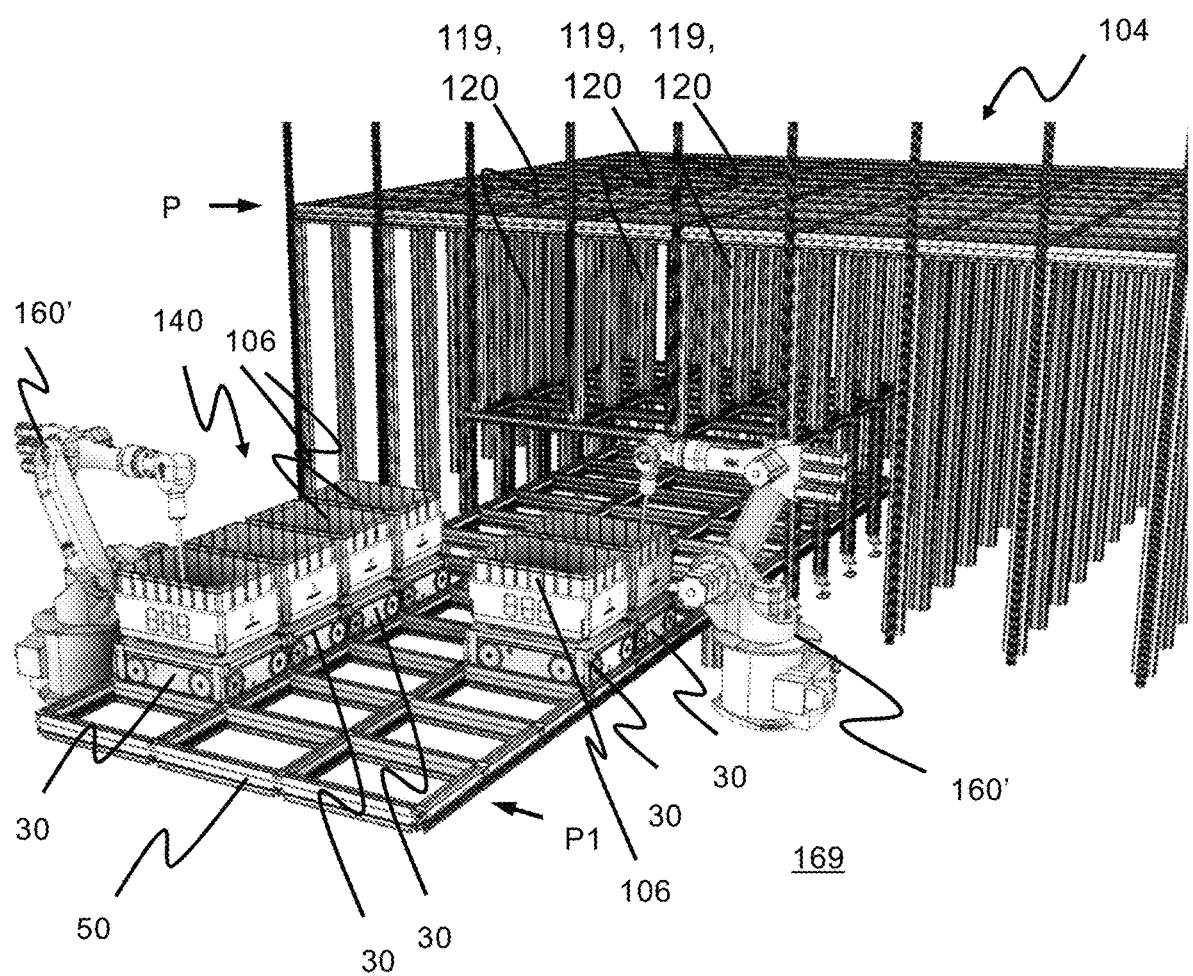
FIG. 5 is a perspective view of an automated storage and retrieval system comprising an automated storage and retrieval grid and a delivery system, and with two robotic operators, wherein the robotic operator is in the form of two robot arms supported on a floor base at the delivery system for picking and placing goods into the storage containers.

FIG. 5 is a perspective view of an automated storage and retrieval system comprising an automated storage and retrieval grid and a delivery system. Most of the features of the system disclosed in FIG. 5 are similar to features described above in relation to FIGS. 4A-4C, except that robotic operators 160' are disclosed.

As is disclosed in FIG. 5, two robotic operators 160' are arranged at a floor base 169 adjacent the delivery rail system 50. Each of the robotic operators 160' are disclosed as having one robot arm and are configured for picking and placing product items or goods into the storage containers 106 and possibly place the picked goods or product items into transport container(s) (not shown in FIG. 5) arranged at a third location outside the delivery rail system 50 for further transport. Although the robotic operators 160' are disclosed with one robot arm, it is clear that one robotic operator 160' may have more than one robot arm, for example, two, three, four, five, . . . , nine, ten arms and so on.

The robotic operators 160' can be operated to move in the XYZ directions thereby allowing access to storage containers 106 at different locations within the delivery rail system 50, and transfer the at least one product item between the storage container 106 within the delivery rail system 50 and a third location outside the delivery rail system 50. The length of the robot arm(s) of the robotic operator(s) 160' as well as other features of the robot arm(s) can be adjusted dependent on the demands in the specific projects such as number of delivery vehicles 30, size of the delivery rail system 50, number of robotic operators 160' etc.

Figure 6A:
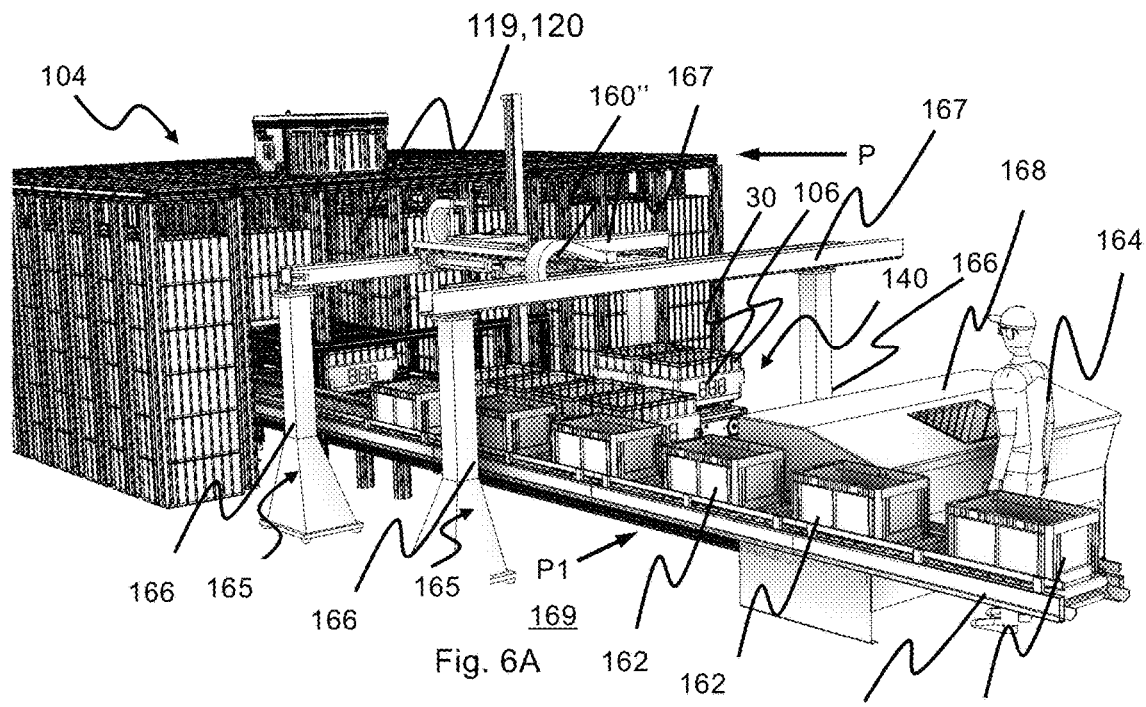
FIGS. 6A and 6B are two different perspective views of an automated storage and retrieval system comprising an automated storage and retrieval grid and a delivery system, and with a gantry arrangement above parts of the delivery system, and wherein the robotic operator in the form of at least one robot arm is suspended from the gantry arrangement.
Figure 6B:
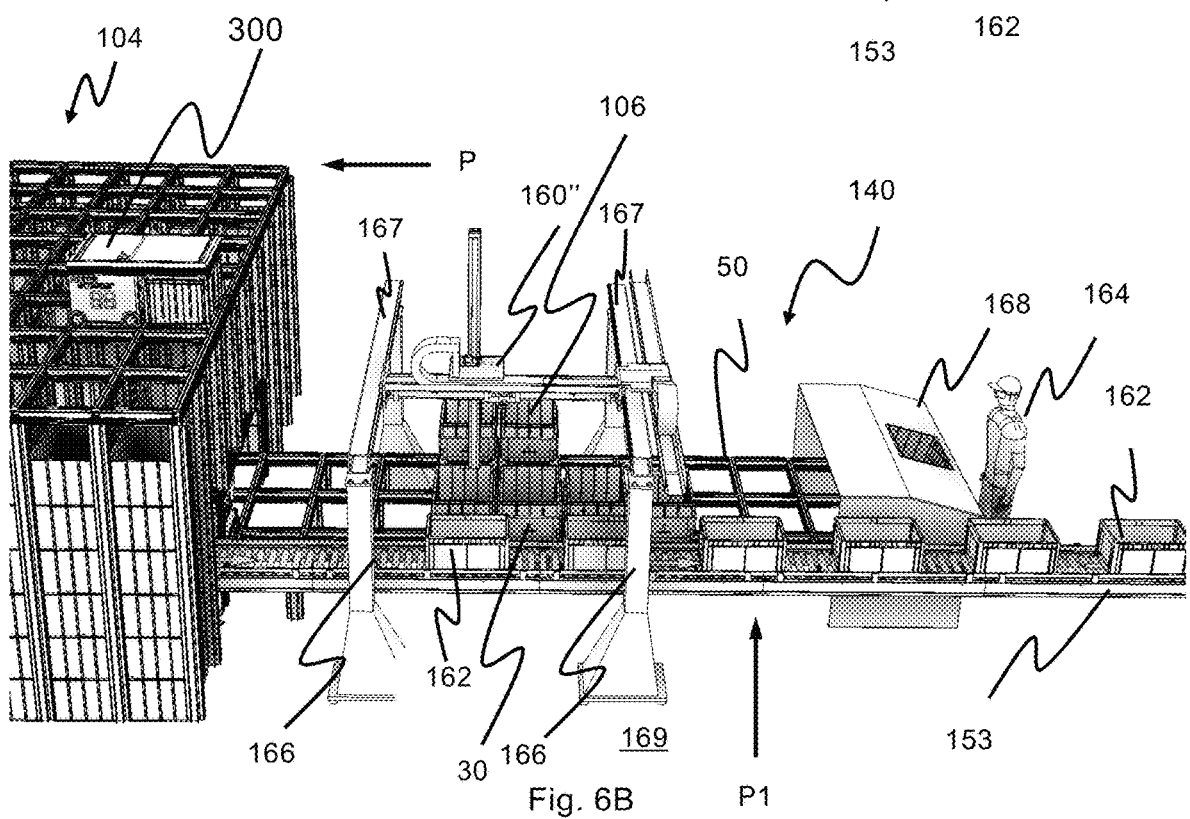

FIGS. 6A and 6B are two different perspective views of an automated storage and retrieval system comprising an automated storage and retrieval grid 104 and a delivery system 140. Most of the features of the system disclosed in FIGS. 6A-6C are similar to features described above in relation to FIGS. 4A-4C, except that a gantry arrangement 165 with suspended robotic operators 160", conveyor belt 153 and human operator 164 operating at a manual handling or picking station 168, are disclosed.

A gantry arrangement 165 is arranged above parts of the delivery rail system 140, and wherein the robotic operator in the form of at least one robot arm is suspended from horizontal bar(s) 167 in the gantry arrangement 165. The robot arm(s) 160" disclosed in FIGS. 6A and 6B may be different from the robot arm(s) 160' disclosed in FIG. 5 or may be similar to the robot arm 160' disclosed in FIG. 5.

Figure 6C:
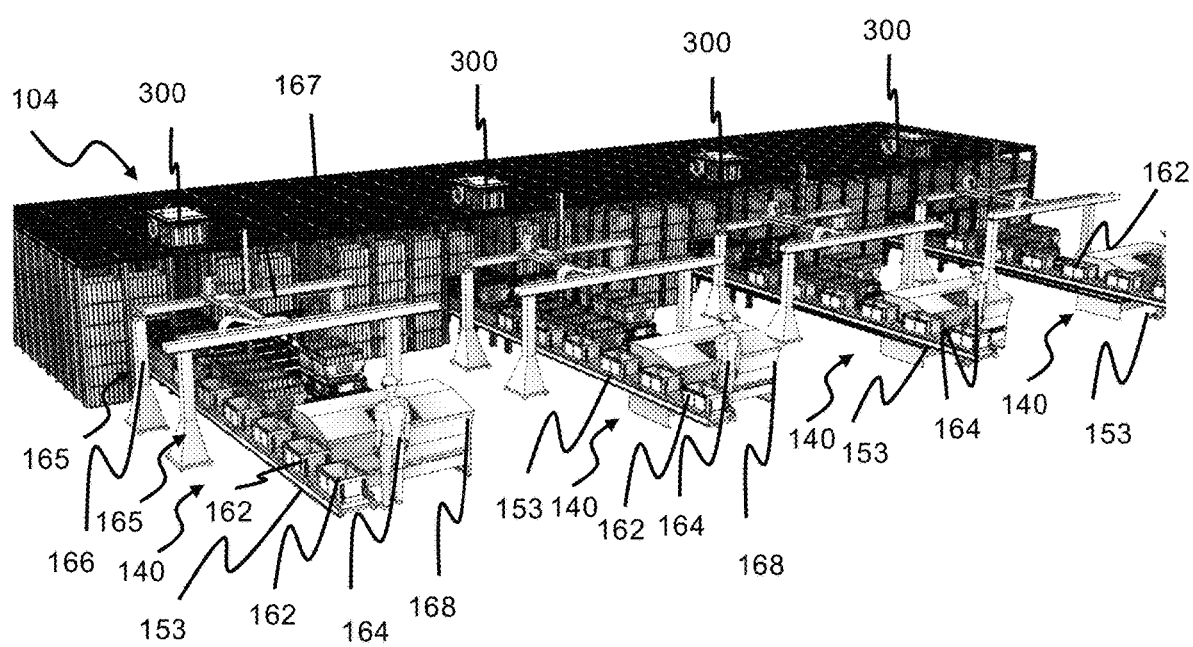
FIG. 6C is an alternative to the system disclosed in FIGS. 6A and 6B and shows a larger system with four delivery rail systems and four gantry arrangements, one arrangement above each of the four delivery rail systems.

The gantry arrangement 165 can be, e.g. as disclosed in FIGS. 6A-6C, a floor-mounted system comprising vertical beams 166 arranged at opposite sides of the delivery rail system 50 connected at the top by horizontal bars 167. Alternatively, the gantry arrangement 165 can be roof-mounted bars (not shown) extending e.g. in the X and Y directions similar to the underlying delivery rail system 50. In either case, one or more robotic operators 160" can be suspended from the gantry arrangement 165.

The gantry arrangement 165 may span over at least parts of the delivery rail system 50. Furthermore, the at least one robot arm 160" may be configured to move in the XYZ directions along the bars and/or beams 166, 167 in the gantry arrangement 165 allowing access to storage containers 106 at different locations within the delivery rail system 50.

At least a part of the gantry arrangement 165 may be laterally offset the delivery rail system 50. The at least one robot arm 160" may be configured to travel laterally along the horizontal bar(s) 167 of the gantry arrangement 165 in order to deliver the at least one product item to, or retrieve at least one product item from, a third location outside the delivery rail system 50.

As is further disclosed in FIGS. 6A-C, 7, a conveyor belt 153 may be arranged at or near a periphery of the delivery rail system 50.

Furthermore, a human operator 164 may cooperate with the robotic operator 160". The human operator 164, may for example operate a manual handling or picking station 168. The delivery rail system 50 may extend into the handling or picking station 168 such that the delivery vehicles 30 can transport the storage containers directly to the human operator 164. The human operator 164 is preferably protected from the delivery vehicles 30 by means of physical barriers. The physical barriers may be in the form of fence (not shown) etc. or, as illustrated in FIGS. 6A and 6B, any sidewalls and or lids in the handling or picking station 168 may be formed of reinforced material.

The conveyor belt 153 may extend from a location (not shown) where transport containers 162 are placed onto the conveyor belt 153 (e.g. the transport containers are either automatically or manually placed on the conveyor belt 153) and, via the delivery system 140 for product item insertion into or removal from the transport container 162, to an area where the transport containers 162 are collected for further transport or shipment (not shown), such as a car, larger container, truck etc.

FIG. 6C is an alternative to the system disclosed in FIGS. 6A and 6B and shows a larger system with four delivery rail systems 140 and four gantry arrangements 165, where one gantry arrangement 165 is arranged above each of the four delivery rail systems 140.

Figure 7A:
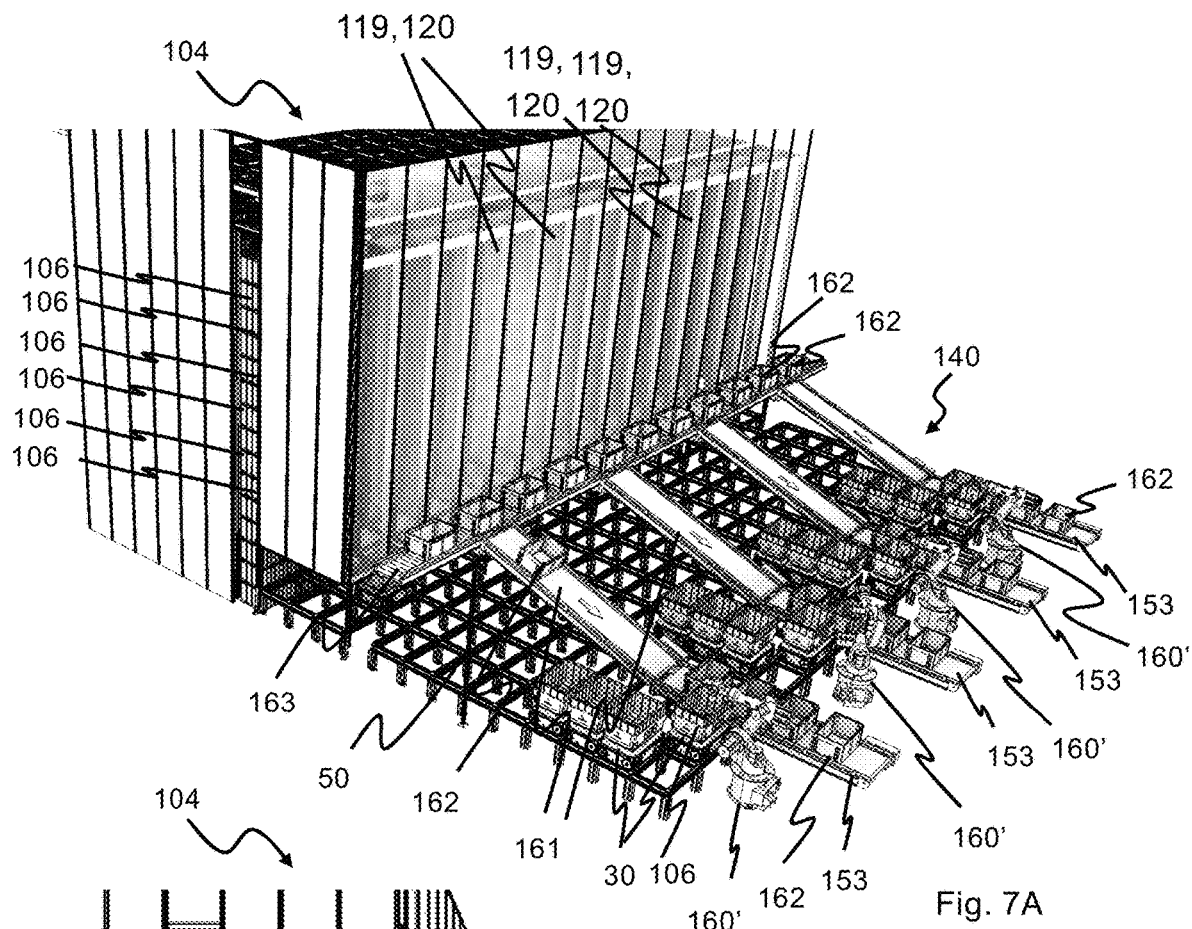
FIGS. 7A-7B are different perspective views of an automated storage and retrieval system comprising an automated storage and retrieval grid and a delivery system, with a common delivery rail system and four robotic operators at different locations outside the delivery rail system, wherein the robotic operator is in the form of at least one robot arm supported on a floor base at the delivery system for picking and placing goods between the storage containers and transport containers on a conveyor belt.
Figure 7B:
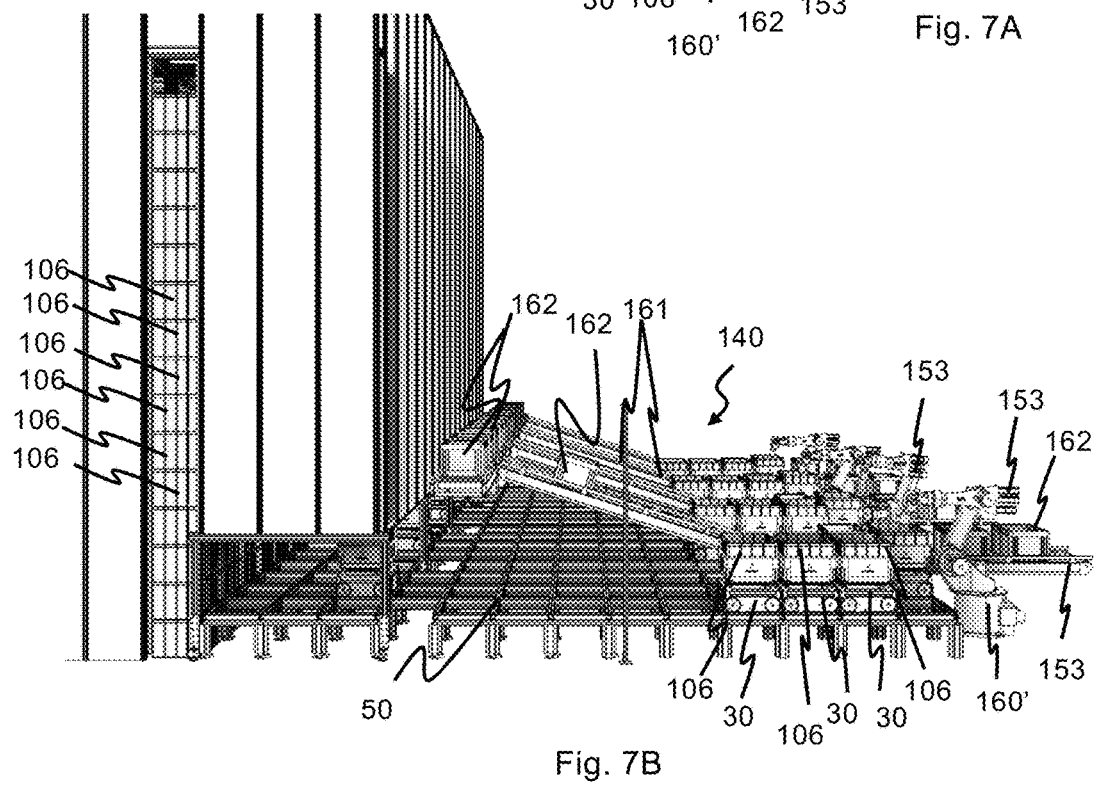

FIGS. 7A-7B are different perspective views of an automated storage and retrieval system comprising an automated storage and retrieval grid 104 and a delivery system 140, with a common delivery rail system and four robotic operators 160' at different locations outside the delivery rail system 50. The robotic operator 160' is in the form of at least one robot arm 160' supported on a floor base 169 adjacent the delivery rail system 50 for picking and placing goods between the storage containers 106 and transport containers 162 on a conveyor belt 153.

A plurality of entry lines 161 for guiding empty transport containers 162 to any one of the conveyor belts 153 may be provided at each of the locations (i.e. second locations) where the robotic operator(s) 160' are arranged. The entry line(s) 161 with empty transport containers 162 may be a system as disclosed in FIGS. 7A and 7B or other suitable systems. In the disclosed system in FIGS. 7A and 7B, the empty transport containers 162 are fed from a conveyor feeding system 163 with multiple separate entrance openings leading to each of the entry lines 161. The entry line(s) 161 may feed the transport containers 162 by means of gravity (i.e. by inclining the entry line 161 relative the second location or using a conveyor mechanism etc.). The system may be operated such that when one robotic operator indicates that it is finished with placing a product item in a transport container 162, a new, empty transport container 162 enters the entry line 161 and thus the conveyor belt 153 associated with said entry line 161. Although not shown in FIGS. 7A-7B, human operators, floor base mounted and/or base mounted, robotic operator(s) 160' may assist/cooperate with any of the robotic operator(s) 160'.

Alternatively, the system may comprise a third location (not shown) in addition to or as a replacement to the conveyor belt 153. The third location may be a temporary position for storing of a plurality of product items. The at least one robot arm 160', 160" may be configured to deliver the at least one product item to the temporary position.

The temporary position can be a transport container 162 for storing one or more product items, e.g. for use in situations where multiple product items are to be transported to the same client in one common shipment (i.e. in order to avoid multiple small shipments to the same client).

Figure 8A:
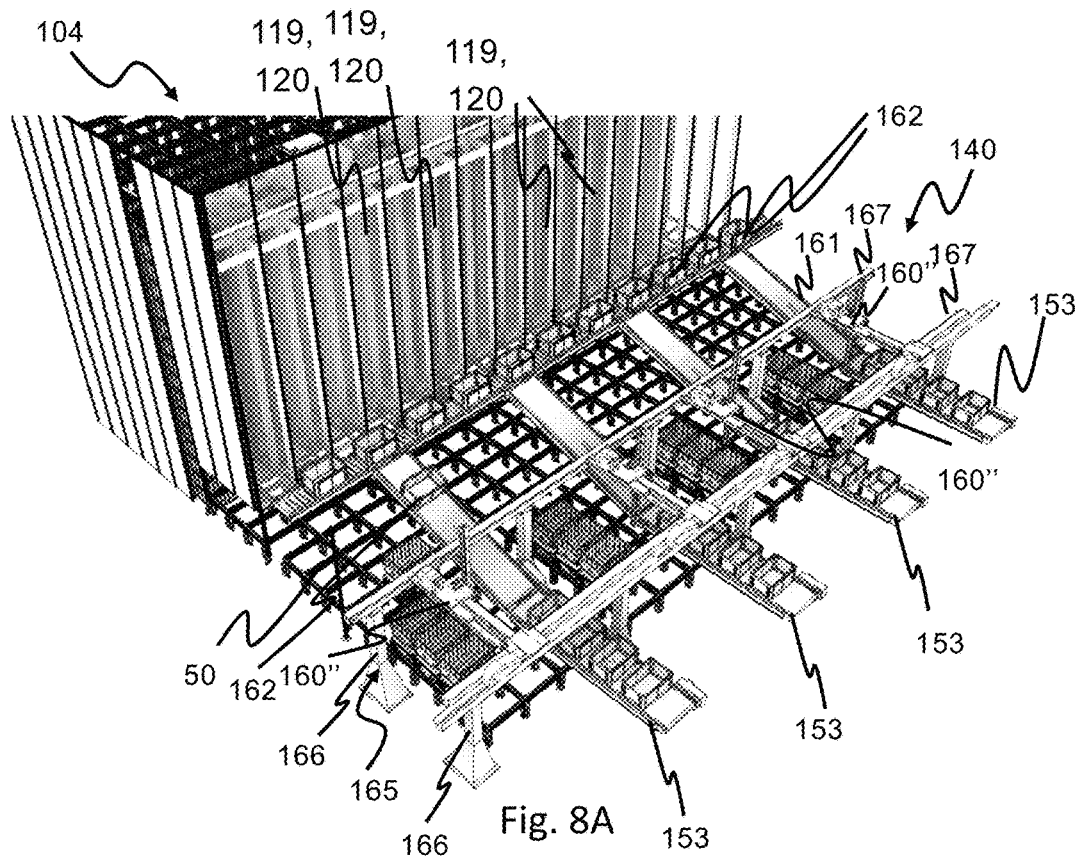
FIGS. 8A-8B are different perspective views of an automated storage and retrieval system comprising an automated storage and retrieval grid and a delivery system, with a common delivery rail system and one common gantry arrangement spanning over parts of the delivery rail system and a plurality of robotic operators in the form of robot arms suspended from the gantry arrangement.
Figure 8B:
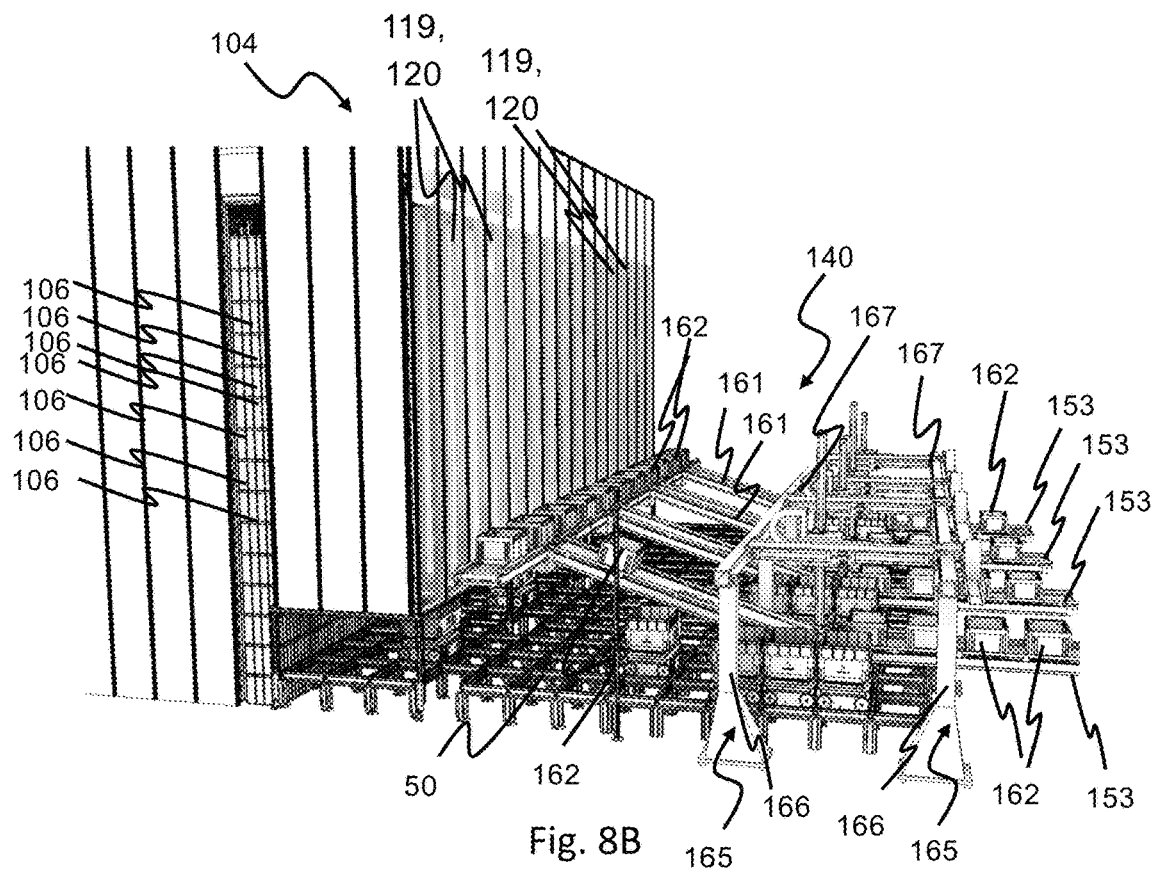

FIGS. 8A-8B are different perspective views of an automated storage and retrieval system comprising an automated storage and retrieval grid 104 and a delivery system 140, with a common delivery rail system 50 and one common gantry arrangement 165 with horizontal beams 167 spanning over the whole width of the delivery rail system 50.

A plurality of robotic operators 160" in the form of robot arms are suspended from the horizontal bars 167 in the gantry arrangement 165. The gantry arrangement 165 to which the robotic operator(s) 160" is suspended, and the robotic operators 160", may be similar to the gantry arrangement 165 and robotic operators 160" described in relation to FIGS. 6A and 6B above. Similarly, the features of the entry line(s) 161 and transport containers 162 may be similar to the system described in relation to FIGS. 7A and 7B above. Although not shown in FIGS. 8A-8B, human operator(s) 164 may assist/cooperate with any of the robotic operator(s) 160',160".

Figure 9A:
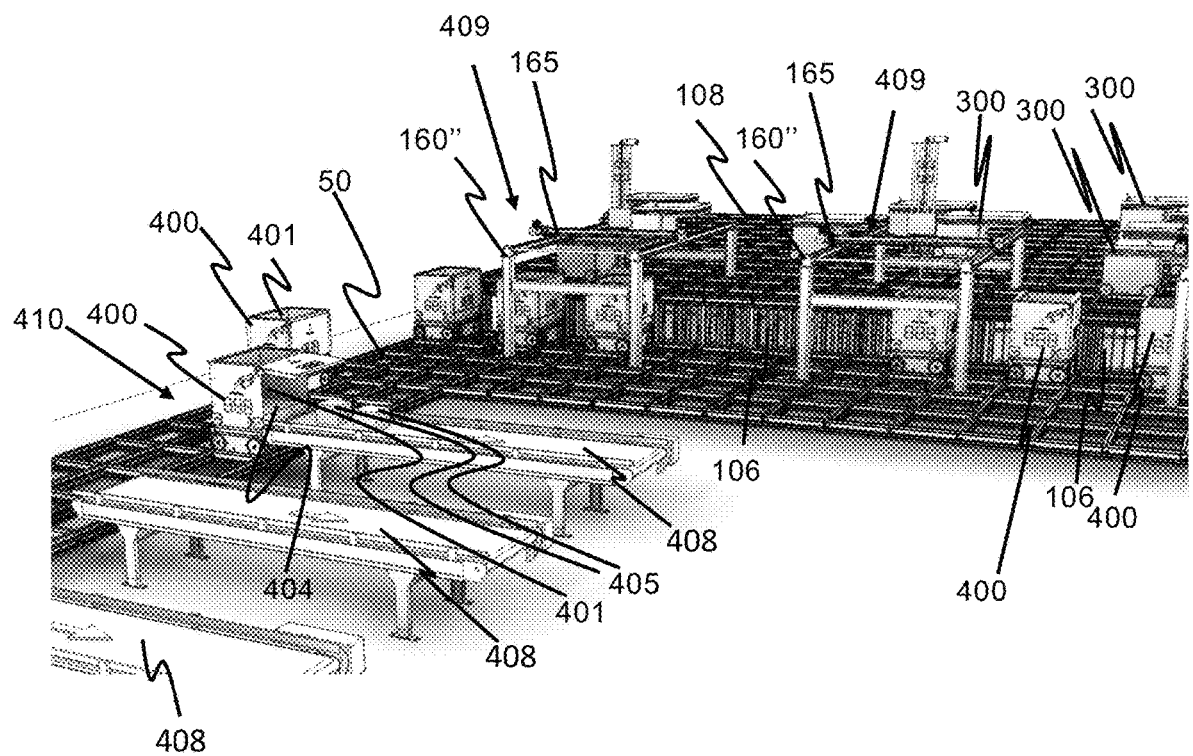
FIG. 9A shows an example of a delivery rail system arranged adjacent a rail system where container handling vehicles operate, and where two gantry arrangements with suspended robotic operator(s) are arranged in a transition zone between the two rail systems, and where the delivery rail system comprises an item consolidation area for receiving and further transport of picked product items.

FIG. 9A shows an example of a delivery rail system 50 arranged adjacent a rail system 108 where container handling vehicles 300 operate, and where two gantry arrangements 165 with suspended robotic operator(s) 160" are arranged in a transition zone between the two rail systems 50,108, and where the delivery rail system 50 comprises an item consolidation area 410 for receiving and further transport of picked product items 405.

Figure 9B:
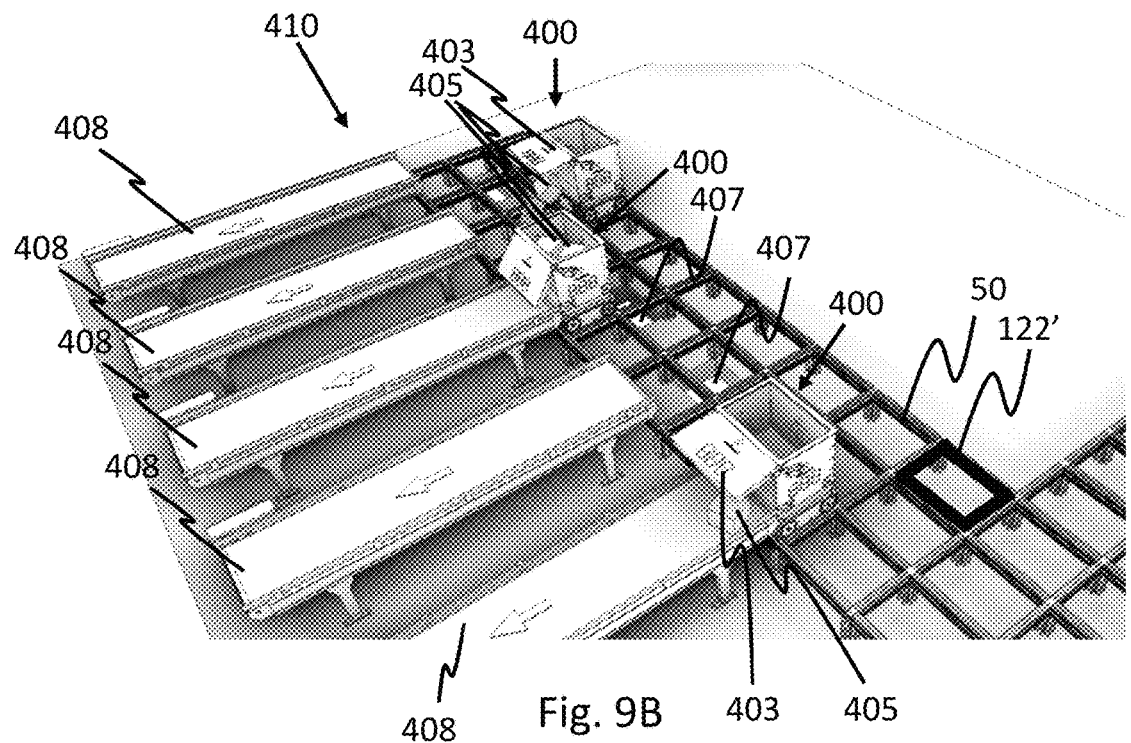
FIG. 9B shows details of the item consolidation area of FIG. 9A, where the consolidation area is disclosed as comprising five conveyors and a number of horizontal openings for receiving and further transport of picked product items.

FIG. 9B shows details of the item consolidation area 410 of FIG. 9A, where the consolidation area 410 is disclosed as comprising five conveyors 408 and a number of horizontal openings 407 for receiving and further transport of picked product items 405.

Figure 9C:
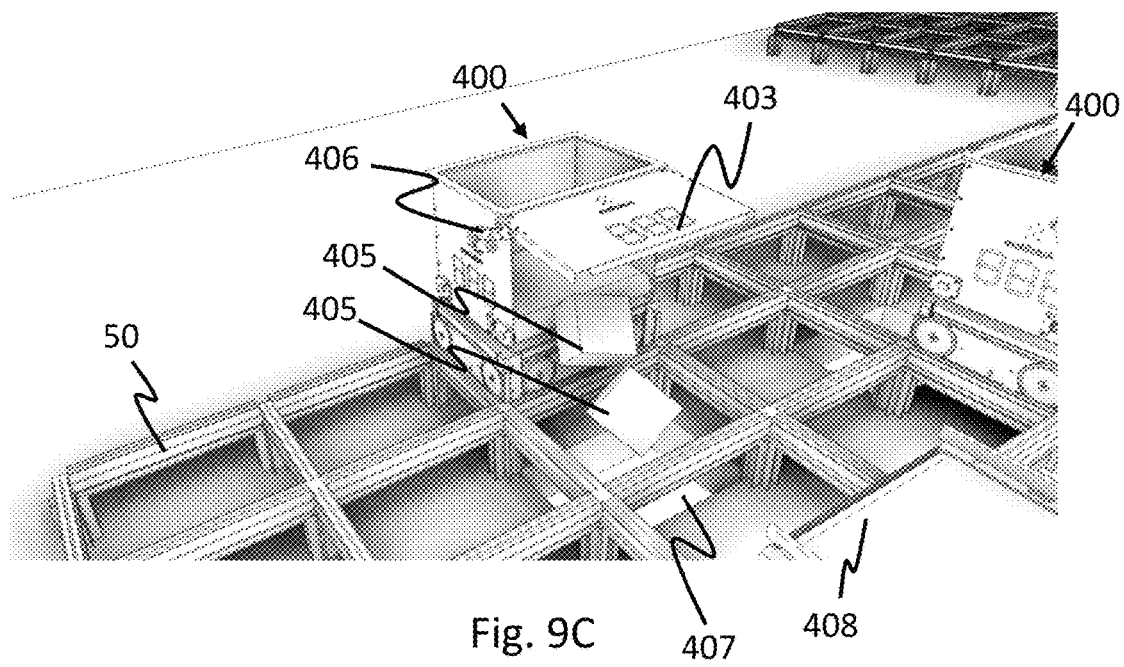
FIG. 9C is a sideview of a consolidation vehicle operable on the delivery rail system, where the consolidation vehicle is disclosed as having an openable sidewall for emptying product items from the item carrier of the consolidation vehicle and into a horizontal opening in the delivery rail system for further transport.

FIG. 9C is a sideview of a consolidation vehicle 400 operable on the delivery rail system 50, where the consolidation vehicle 400 is disclosed as having an openable sidewall 403 for emptying product items 405 from an item carrier 401 of the consolidation vehicle 400 and into a horizontal opening 407 in the delivery rail system 50 for further transport.

Figure 10A:
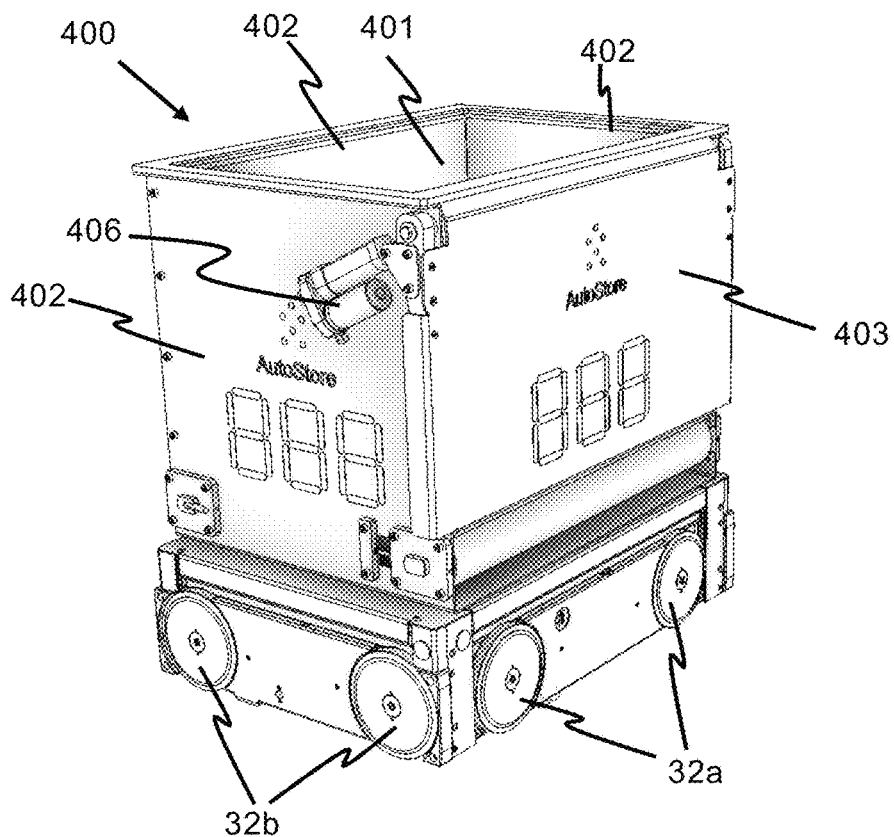
FIGS. 10A and 10B disclose a consolidation vehicle with an actuator for opening (FIG. 10B) and closing (FIG. 10A) an openable sidewall of the consolidation vehicle such that product items can be emptied from the item carrier of the consolidation vehicle.
Figure 10B:
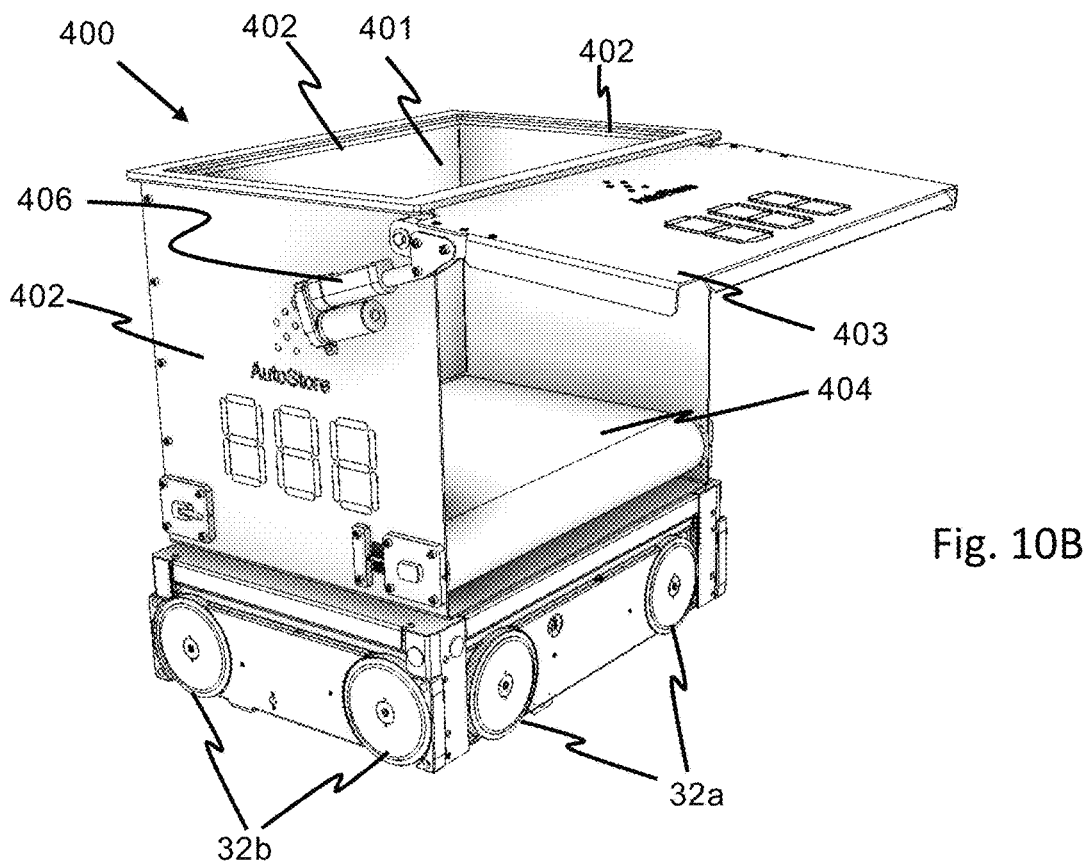

FIGS. 10A and 10B disclose a consolidation vehicle 400 with an actuator 406 for opening (FIG. 10B) and closing (FIG. 10A) an openable sidewall 403 of the consolidation vehicle 400 such that product items 405 can be emptied from the item carrier 401 of the consolidation vehicle 400.

Figure 10C:
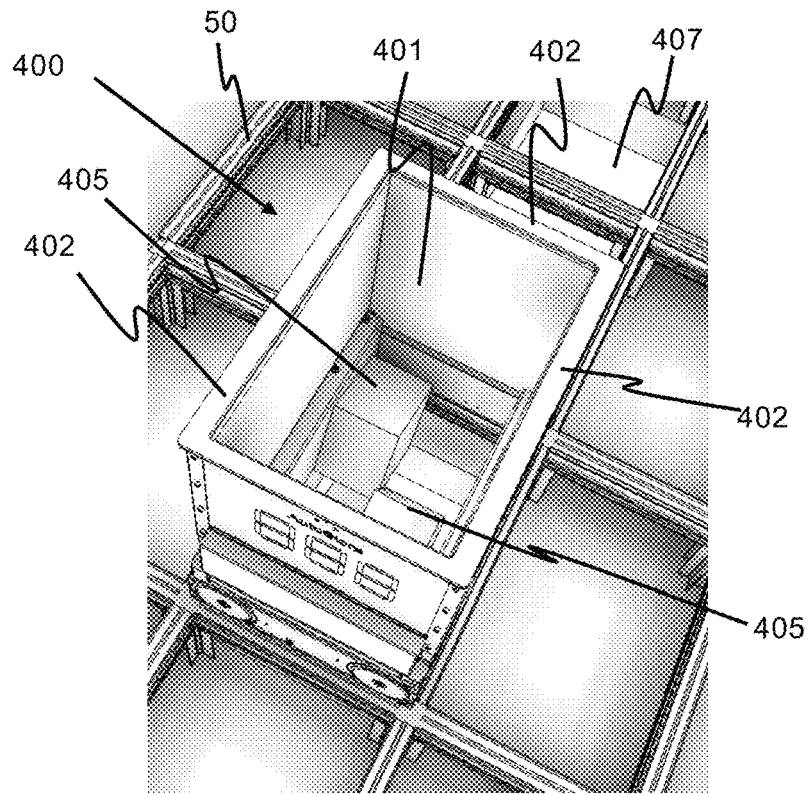
FIGS. 10C and 10D disclose a consolidation vehicle with an openable bottom section, such that product items in the item carrier in the consolidation vehicle may drop by gravity to a level below the consolidation vehicle, possibly through an underlying horizontal opening for further transport.
Figure 10D:
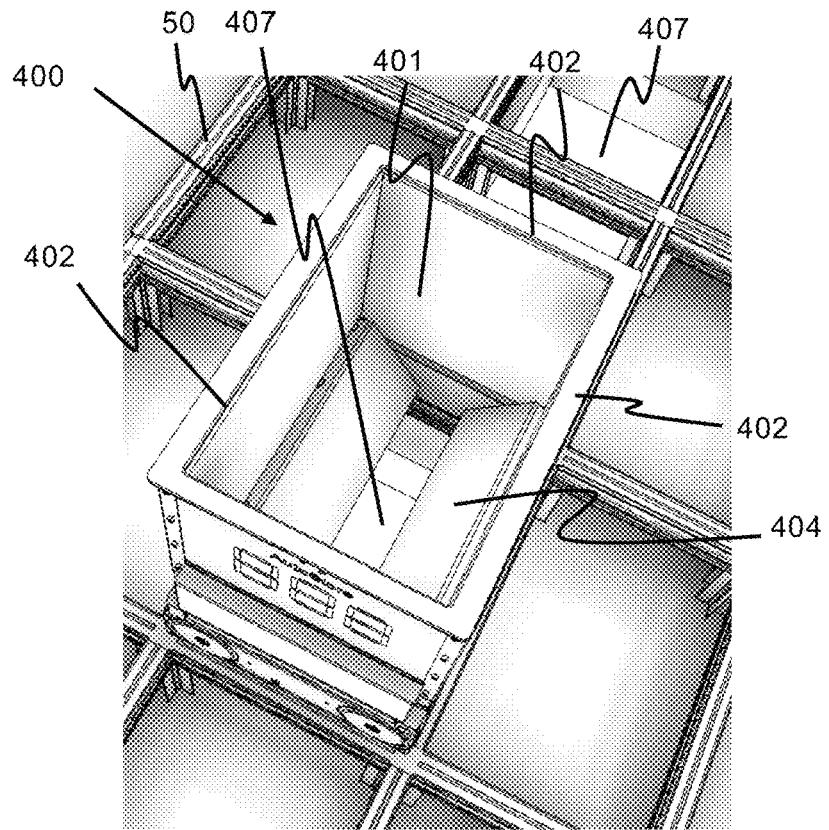

FIGS. 10C and 10D disclose a consolidation vehicle 400 with an openable bottom section 404, such that product items 405 in the item carrier 401 in the consolidation vehicle 400 may drop by gravity to a level below the consolidation vehicle 400, preferably through an underlying horizontal opening 407 for further transport.

Figure 10E:
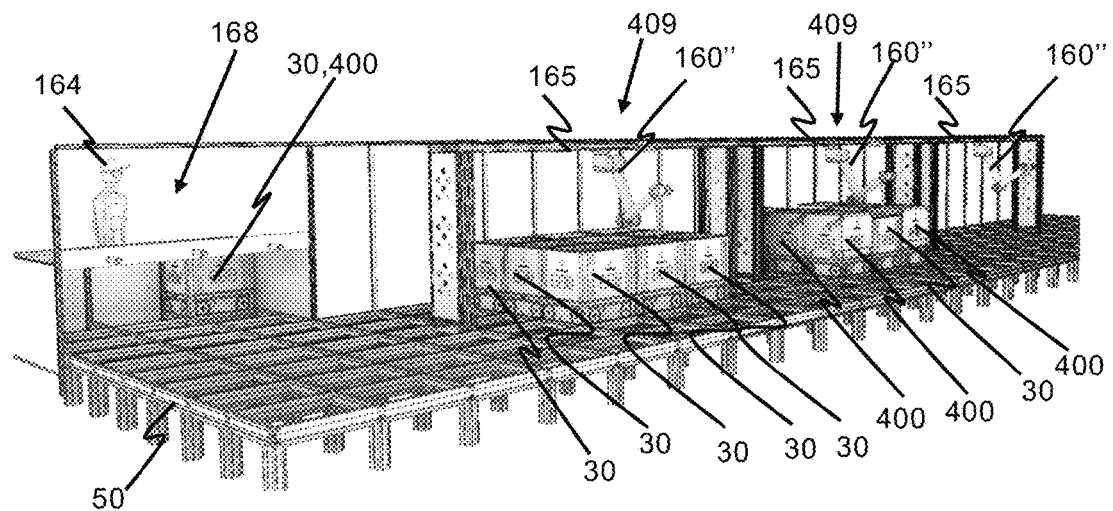
FIG. 10E discloses (starting from left to right in the figure): a delivery rail system with a handling or picking station; an item picking area with a robotic operator for moving product items between storage containers carried by delivery vehicles; and an item picking area with a robotic operator for moving product items from storage container(s) to item carrier of a consolidation vehicle.

FIG. 10E discloses (starting from left to right in the figure): a delivery rail system 50 with a handling or picking station 168; an item picking area 409 with a robotic operator 160" for moving product items 405 between storage containers 106 carried by delivery vehicles 30; and an item picking area 409 with a robotic operator 160" for moving product items 405 from storage container(s) 106 to item carrier 401 of a consolidation vehicle 400. A storage container 106 can be transported to the item picking area 409 (se FIG. 10E, 10F), i.e. the item picking area 409 serves as the second location, by the delivery vehicle 30 and product item(s) 405 within the storage container 106 can be picked from the storage container 106 by the robotic operator 160', 160" and the picked product item 405 can be placed into another storage container 106 or into an item carrier 401 on a consolidation vehicle 400.

Figure 10F:
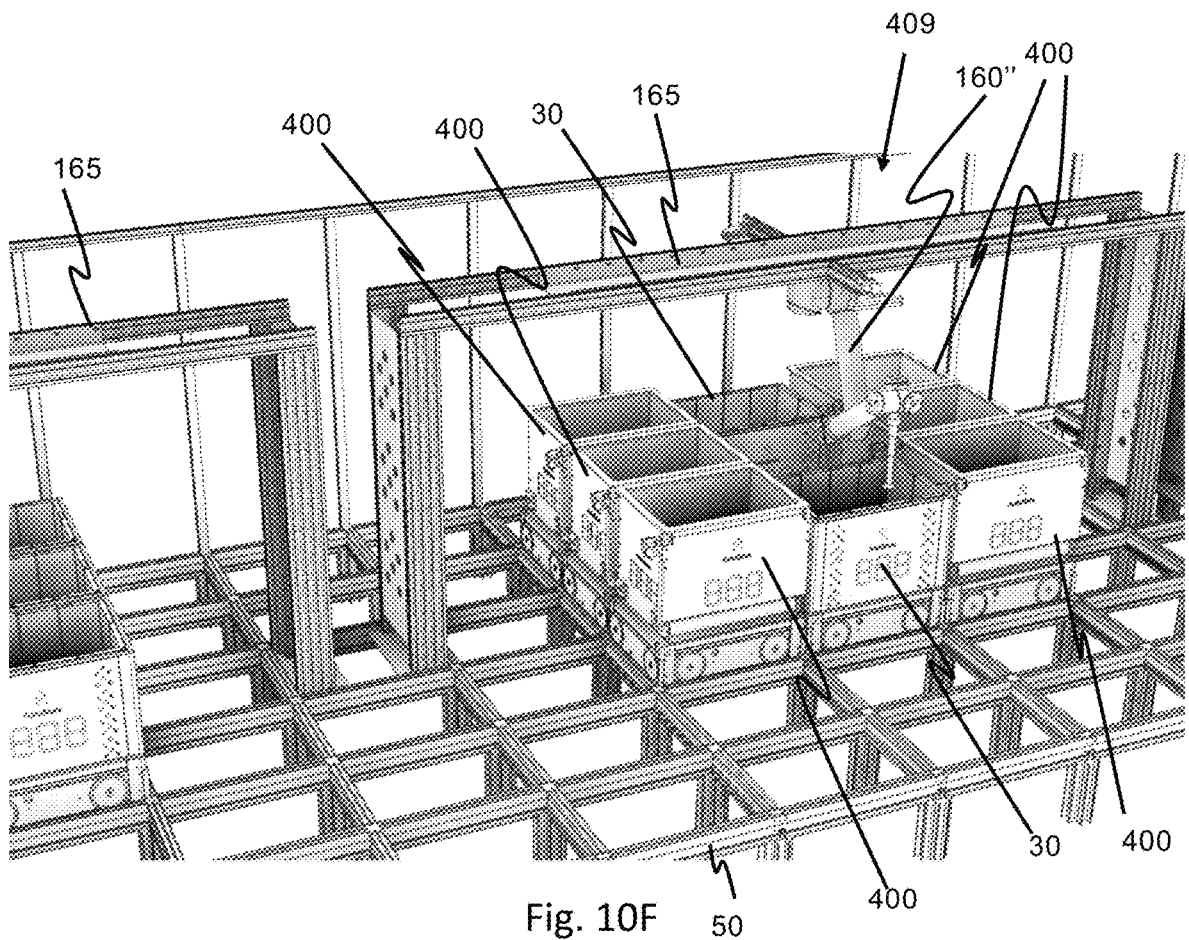
FIG. 10F shows details of the item picking area with a robotic operator for moving product items from storage container(s) to item carrier of a consolidation vehicle of FIG. 10E.

FIG. 10F shows details of the item picking area 409 with a robotic operator 160" for moving product items 405 from storage container(s) 106 to an item carrier 401 of a consolidation vehicle 400 of FIG. 10E.

Further referring to FIGS. 9A-9C and FIGS. 10A-10D, the consolidation vehicle 400 may be movable both in X and Y directions on the delivery rail system 50, including to locations on the delivery rail system 50 where the robotic operators 160',160" can place or pick product items 405 into or out of the item carrier 401 on the consolidation vehicle 400. Such a location on the delivery rail system 50 is referred to as item picking area 409 herein. The item carrier 401 may comprise four sidewalls 402, 403, a bottom section 404 and an open top, wherein one of the sidewalls 403 or the bottom section 404 can be openable, such that the product items 405 may be emptied from the item carrier 401 in a horizontal or vertical direction, respectively, at the item consolidation area 410. The item consolidation area 410 may comprise a conveyor 408 preferably flush or somewhat lower than the bottom section 404 of the item carrier 401 and/or a horizontal opening(s) 407 inside the delivery rail system 50. The item consolidation area 410 is an area where the consolidation vehicle 400 may be positioned to empty the product items 405 stored in the item carrier 401 before the product item(s) is further transported to e.g. a packaging/processing assembly. In order for this to be possible, one of the sidewalls 403 or the bottom section 404 may be a trapdoor/hatch.

In an embodiment, one of the sidewalls 403 or the bottom section 404 may be connected to an actuator 406 (see FIGS. 9A, 9C, 10A, 10B) such that the sidewall 403 or bottom section 404 may be opened and closed by activating the actuator 406. In other words, the openable sidewall 403 or bottom section 404 provides an opening in the item carrier 401 when the openable sidewall 403 or bottom section 404 is in an open position. Alternatively, one of the sidewalls 403 or bottom section 404 is made up of, or comprises, at least one actuated surface.

The consolidation vehicle 400 may comprise a wheel arrangement 32a,32b (see FIGS. 10A, 10B) for moving the consolidation vehicle 400 in two perpendicular directions upon the delivery rail system 50.

The openable sidewall 403 or the bottom section 404 may comprise a hinged surface or sidewall 403. The openable sidewall 403 may be such arranged relative a conveyor 408 (see FIG. 10B) forming the bottom section 404 in the consolidation vehicle 400 that when the sidewall 403 is opened, product items 405 are not restricted by the sidewall 403 from being emptied sideways under influence from movement by the conveyor 408 arranged in the bottom section 404 of the item carrier 401. The conveyor 408 may comprise belt, roller etc. As an alternative to conveyor, it is possible to provide a pushing arrangement which pushes any item(s) out of the item carrier.

The openable sidewall 403 may be hinged at an upper end such that a lower end is raised when in the open position.

The item consolidation area 410 (see FIGS. 9A-9C) may comprise a horizontal opening 407 or a conveyor 408 arranged to guide product items 405 emptied from the consolidation vehicle 400 to the packaging/processing assembly. The conveyor 408, preferably a belt conveyor 408, may be arranged to guide and transport product items 405 in a lateral direction.

The opening 407 may be arranged at a level below the delivery rail system 50.

The opening 407 may be arranged above a packaging/processing assembly (not shown), such as a belt conveyor featuring packaging boxes into which product items 405 from the consolidation vehicle 400 may be guided.

The delivery rail system 50 may be dual-track rails, such that two consolidation vehicles 400 may pass each other upon adjacent grid cells of the delivery rail system 50.

The consolidation vehicle 400 may have a horizontal periphery fitting within the horizontal area defined by a grid cell 122' of the delivery rail system 50 (see FIG. 9B).

The wheel arrangement 32a,32b of the consolidation vehicle 400 may comprise eight wheels, wherein a first set 32a of four wheels enable the lateral movement of the consolidation vehicle in a first direction and a second set 32b of the remaining four wheels enable the lateral movement in a second direction being perpendicular to the first direction. One or both sets of wheels 32a,32b in the wheel arrangement may be connected to a wheel lifting mechanism and can be lifted and lowered, so that the first set of wheels 32a and/or the second set of wheels 32b can be engaged with the underlying respective delivery rail system 50 at any one time.

The consolidation vehicle may comprise an actuator 406 connected to the openable sidewall or the bottom. The actuator 406 can be arranged to move the sidewall 403 and the bottom section 404, respectively, between an open and closed position. In the open position, a product item 405 situated in the item carrier 401 may be emptied out of the item carrier 401. Alternatively, one of the sidewalls 403 or bottom 404 is made up of or comprises at least one actuated cover.

Referring to FIGS. 10E and 10F, according to a further aspect, or in addition to the foregoing, the robotic operator(s) 160',160" may be configured to re-organize or re-arrange product item(s) 405 within a storage container 106 or the item carrier 401, and/or move product item(s) between storage containers 106, e.g. storage containers 106 carried by delivery vehicles 30 as described herein, and/or item carriers 401 in consolidation vehicles 400. Such re-organization, re-arrangement and/or movement of product items 405 within storage containers 106, between different storage containers 106, and/or between storage container(s) and item carrier(s) in consolidation vehicle(s) may be performed in dedicated item picking areas 409 within the delivery rail system 50. The robotic operator(s) 160", exemplified in FIGS. 10E and 10F as robotic operators 160" suspended from a gantry arrangement 165, may be configured to transfer product items 405 between storage containers 106 carried by delivery vehicles 30 prior to storage of at least one of the storage container 106, and/or prior to at least one of the storage containers 106 being presented for picking of product items 105 therein, which picking may be performed e.g. at the handling or picking station 168.

Therefore, the robotic operators 160" may be configured to organize product items 405 in the storage and retrieval system, and/or may be used to cultivate the contents of storage containers 106 e.g. before the storage containers 106 are presented for selection of product items 405 therein e.g. for delivery or the like. This may be advantageous for example in the event that one storage container 106 is almost empty and that the remaining product item(s) 405 is moved to another storage container 106 with the same product item(s) 405 or in the event that the robotic operator 106" picks part of, or finishes, a product order in an item carrier 401 in a consolidation vehicle 400 for presentation at the handling or picking station 168 or for directly transfer to e.g. a horizontal opening 407 or to a conveyor 408 (see FIGS. 9A, 9B) at the item consolidation area 410 through the openable sidewall 403 or bottom section 404.

Such a move may be performed by using e.g. the setup of FIG. 10A by utilizing a an item picking area 409 where a robot arm 160" which could pick up a product item 405 from a storage container 106 in a first remotely operated delivery vehicle 30, then a second remotely operated delivery vehicle 30 with a storage container 106 could replace the first remotely operated delivery vehicle 30 or position itself within arm's reach of the robotic operator 160", and then the arm 160" could place the product item 405 in the storage container 106 in the second remotely operated delivery vehicle 30. The robot arm could also transfer product items 405 between neighboring or near-by delivery vehicles 30 or storage containers 106, e.g. without the delivery vehicles 30 moving during the transfer. Alternatively, as shown in FIG. 10F, one or more delivery vehicle(s) 30 may position themselves next to a consolidation vehicle 400, all vehicles 30, 400 being within arm's reach of the robotic operator 160". The example of FIG. 10F provides for the possibility of arranging maximum eight vehicles, both delivery vehicles 30 and consolidation vehicles 400, within the item picking area 409 (i.e. within arm's reach of the robotic operator 160") at the time. The robotic operator 160" may then pick product items 405 from one or more of the storage containers 106 carried by delivery vehicles 30 and put the product item(s) 405 into the item carrier 401 in a consolidation vehicle 400 for presentation at the handling or picking station 168 or for directly transfer to the horizontal opening 407 or to the conveyor 408 (see FIGS. 9A, 9B) in the item consolidation area 410 through the openable sidewall 403 or bottom section 404. In this latter solution, the second location and/or third location may be an item carrier 401 in a consolidation vehicle 400.

Furthermore, or alternatively, a robotic operator 160" may move all product item(s) 405 from one container 106 into another, for example combining partially empty storage containers 106 to make a full container 106 and a spare empty container 106 Conversely, the robotic operators 160" could evenly distribute product items 405 from a storage container 106 to ensure multiple storage containers 106 have the needed product item 405, increasing access efficiency for that product item 405 type. In this latter solution, the second location and/or third location may be a storage container 106 on another remotely operated delivery vehicle 30.

Furthermore, as indicated above and with reference to FIG. 10E, a robotic operator 160" at an item picking area 409 may also be used as part of a process of re-organization of product item(s) 405 in a storage container 106 before the storage container 106 with product item(s) 405 is presented to an operator 164 at a handling or picking station 168. The product items 405 in the storage container 106 may have been picked by robotic operator(s) 160" or the storage container 106 may come directly from a stack 107 of storage containers 106 beneath the container handling vehicle rail system 108. Then an operator 164 at the handling or picking station 168 may only need to confirm storage container contents before the storage container 106 is prepared for further transport or shipment. In case the product item(s) 405 are disorderly arranged within the storage container 106, a robotic operator 160" may be utilized to systemize or re-organize the product item(s) 405 in an intermediate pre-picking stage such that when the storage container 106 arrives at the handling or picking station 168 the product item(s) 405 are automatically organized such that all of them are visible from above by a human operator 164 or a camera (the operator may then be at another location and simply confirm the content in the storage container by controlling snapshot(s) taken by the camera of the product item(s) within the storage container).

Such a method may include the steps of, after the storage container 106 has been transported to the second location, e.g. item picking area 409, by the delivery vehicle 30, to pick at least one product item 405 in the storage container 106 by the robotic operator 160',160" and automatically place the picked product item 405 into the same storage container 106 such as to re-organize product item(s) 405 in the storage container 106.

Furthermore, the robotic operator 160',160" may also be used as part of a process of re-organizing product item(s) 405 of different category/ies stored in one common storage container 106 to a plurality of other storage containers 106, e.g. one storage container 106 for each of the different product categories. For example, one storage container 106 may comprise a variety of medicines from one medicine provider and may be stored in the automated storage and retrieval grid 1. Then the automated storage and retrieval system may, whenever it has time and capacity, bring this storage container 106 with different medicines to the robotic operator(s) 106" at the second location, e.g. the item picking area 409, such that the robotic operator(s) 160" can place one type of medicine in respective storage containers 106.

Such a method may include the steps of, after the storage container 106 has been transported the second location by the delivery vehicle 30, to pick at least one product item 405 from the storage container 106 by the robotic operator 160',160" and placing the picked product item 405 in another respective storage container 106.

Common to all of the different robotic operators 160', 160" described above, they may be provided with suitable gripping device(s), as well as any necessary auxiliary equipment such as camera, light, distance sensors etc., dependent on demands in the specific project and size and shape of the product items. Such equipment will be known to the skilled person and is not further specified herein. Furthermore, the means needed for suspending the robotic operator(s) 160" to the horizontal beams 167 of the gantry arrangement 165 may be any means providing the desired function of movement in the XYZ-directions relative the underlying delivery rail system 50, which means are known to the skilled person and will not be further described herein. Similarly, any fastening necessary for the floor base mounted robotic operators 160', or base on delivery rail 50, will be known to the skilled person, i.e. any means providing necessary stability and or facilitates the possibility of rotational movement of the robotic operator 160' relative the floor base 169 or delivery rail base (not shown).

The invention provides a high efficiency automated storage and retrieval system which is easy to install and in which delivery capacity can easily be increased after completed installation.

In the preceding description, various aspects of the automated storage and retrieval system and associated method of picking product items using robotic operators have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

REFERENCE NUMERALS

1 Automated storage and retrieval system
30 Delivery vehicle
31 Vehicle body
32 Rolling device
32a First set of wheels
32b Second set of wheels
35 Container carrier
36 Conveyor
45 Lifting arm
50 Delivery rail system
51 First set of parallel rails
52 Second set of parallel rails
P1 Horizontal plane of delivery rail system
100 Framework structure
102 Upright members of framework structure
103 Horizontal members of framework structure
104 Storage grid/three-dimensional grid
105 Storage column
106 Storage container
107 Stack
108 Rail system/Container handling vehicle rail system
110 First set of parallel rails in first direction X
112 Grid column
111 Second set of parallel rails in second direction Y
115 Grid opening
119 Delivery column
120 Delivery column
122 Grid cell
122' Grid cell delivery rail system
140 Delivery system
150 Delivery port
151 Mezzanine level
153 Conveyor belt
160' Robotic operator, floor base mounted
160" Robotic operator, suspended from gantry arrangement
161 Entry line
162 Transport container
163 Conveyor feeding system
164 Human operator
165 Gantry arrangement
166 Vertical beam
167 Horizontal bar
168 Handling or picking station
169 Floor base
200 First container handling vehicle
201 Wheel arrangement
300 Second container handling vehicle
301 Wheel arrangement
X First direction
Y Second direction
P Horizontal plane of rail system
P1 Horizontal plane of delivery rail system
400 Consolidation vehicle
401 Item carrier in consolidation vehicle
402 Sidewall
403 Openable sidewall
404 Bottom section
405 Product item
406 Actuator
407 Horizontal opening
408 conveyor
409 Item picking area
410 Item consolidation area

The invention claimed is:

1. An automated storage and retrieval system comprising an automated storage and retrieval grid and a delivery system, wherein the automated storage and retrieval grid comprises:

a container handling vehicle rail system comprising a first set of parallel rails arranged in a first horizontal plane and extending in a first direction, and a second set of parallel rails arranged in the first horizontal plane and extending in a second direction which is orthogonal to the first direction, which first and second sets of rails form a grid pattern in the first horizontal plane comprising a plurality of adjacent container handling vehicle grid cells, each container handling vehicle grid cell comprising a container handling vehicle grid opening defined by a pair of neighboring rails of the first set of parallel rails and a pair of neighboring rails of the second set of parallel rails;

a plurality of container handling vehicles operable on the container handling vehicle rail system, the plurality of container handling vehicles being operable to retrieve a storage container from a stack of storage containers beneath the container handling vehicle rail system; and a delivery column adapted for transport of a storage container between a container handling vehicle and a delivery port situated at a lower end of the delivery column;

wherein the delivery system comprises:
a delivery rail system, the delivery rail system comprising a third set of parallel rails arranged in a second horizontal plane and extending in the first direction, and a fourth set of parallel rails arranged in the second horizontal plane and extending in the second direction which is orthogonal to the first direction; and
a remotely operated delivery vehicle configured to travel on the delivery rail system, the remotely operated delivery vehicle comprising a container carrier adapted to support the storage container; and
a second location on the delivery rail system, wherein the second location comprises a robotic operator for handling of product items in the storage container;
wherein the delivery port is arranged at a level above the delivery rail system allowing the remotely operated delivery vehicle to be positioned directly below the delivery column,
wherein the remotely operated delivery vehicle is further adapted to transport the storage container between a first location represented by the delivery port and the second location, and
wherein the robotic operator is able to reach multiple positions within the delivery system in order to access storage containers transported on remotely operated delivery vehicles and positioned at different locations within the delivery system.

2. The automated storage and retrieval system according to claim 1, wherein the system further comprises a gantry arrangement above the remotely operated delivery vehicle, and wherein the robotic operator comprises at least one robot arm and is suspended from the gantry arrangement.

3. The automated storage and retrieval system according to claim 2, wherein the gantry arrangement spans over at least parts of the delivery rail system and wherein the at least one robot arm is configured to move in XYZ directions to access storage containers at different locations within the delivery rail system.

4. The automated storage and retrieval system according to claim 2, wherein at least a part of the gantry arrangement is laterally offset from the delivery rail system and wherein the at least one robot arm is configured to travel laterally along the gantry arrangement in order to deliver at least one product item to, or retrieve at least one product item from, a third location outside the delivery rail system.

5. The automated storage and retrieval system according to claim 2, wherein at least a part of the gantry arrangement is laterally offset from the delivery rail system and wherein the at least one robot arm is configured for product item insertion or removal from, a third location outside the delivery rail system by varying extension of robot arm length.

6. The automated storage and retrieval system according to claim 4, wherein the third location is a temporary position for storing of a plurality of product items.

7. The automated storage and retrieval system according to claim 1, wherein the robotic operator comprises at least one robot arm supported on one of a floor base, a base above the delivery rail system, and on the delivery rail system.

8. The automated storage and retrieval system according to claim 7, wherein the at least one robot arm is configured to be moved in XYZ directions to access storage containers at different locations within the delivery rail system and transfer at least one product item between the storage container within the delivery rail system and a third location outside the delivery rail system.

9. A method of transporting a storage container between an automated storage and retrieval grid and a second location for handling product items in the storage container by a robotic operator, the automated storage and retrieval grid comprising:
a container handling vehicle rail system comprising a first set of parallel rails arranged in a first horizontal plane and extending in a first direction, and a second set of parallel rails arranged in the first horizontal plane and extending in a second direction which is orthogonal to the first direction, which first and second sets of rails form a grid pattern in the first horizontal plane comprising a plurality of adjacent container handling vehicle grid cells, each container handling vehicle grid cell comprising a container handling vehicle grid opening defined by a pair of neighboring rails of the first set of parallel rails and a pair of neighboring rails of the second set of parallel rails;
a plurality of container handling vehicles guided on the container handling vehicle rail system, the plurality of container handling vehicles being operable to retrieve a storage container from a stack of storage containers beneath the container handling vehicle rail system;
a delivery column adapted for transport of a storage container between a container handling vehicle and a delivery port situated at a lower end of the delivery column;
a delivery rail system, the delivery rail system comprising a third set of parallel rails arranged in a second horizontal plane and extending in the first direction, and a fourth set of parallel rails arranged in the second horizontal plane and extending in the second direction which is orthogonal to the first direction; and
a remotely operated delivery vehicle configured to travel on the delivery rail system, the remotely operated delivery vehicle comprising a container carrier adapted to support the storage container;
wherein the delivery port is arranged at a level above the delivery rail system allowing the remotely operated delivery vehicle to be positioned directly below the delivery column; and
wherein the method comprises:
lowering the storage container through the delivery column to a first location represented by the delivery port;
positioning a remotely operated delivery vehicle below the delivery port for receiving a storage container onto a container carrier provided on the remotely operated delivery vehicle;
transporting the storage container to the second location using the remotely operated delivery vehicle; and
using at least one robotic operator to pick at least one product item from the storage container at the second location, wherein the robotic operator is able to reach multiple positions within the delivery rail system in order to access storage containers transported on remotely operated delivery vehicles and positioned at different locations within the delivery rail system.

10. The method according to claim 9, further comprising:
operating the remotely operated delivery vehicle to return to the delivery port by operating a rolling device of the remotely operated delivery vehicle; and
lifting the storage container from the remotely operated delivery vehicle and through at least one delivery column for storage of the storage container in the automated storage and retrieval grid.

11. The method according to claim 9, wherein the method further comprises:
utilizing a robotic operator comprising at least one robot arm suspended from a gantry arrangement above the remotely operated delivery vehicle.

12. The method according to claim 11, wherein the gantry arrangement spans over at least part of a delivery rail system on which the remotely operated delivery vehicle operates and the method further comprises:
operating the at least one robot arm to move in XYZ directions thereby allowing access to storage containers at different locations within the delivery rail system.

13. The method according to claim 12, wherein at least a part of the gantry arrangement is laterally offset from the delivery rail system and wherein the method comprises:
operating the at least one robot arm to travel laterally along the gantry arrangement in order to deliver the at least one product item to, or retrieve at least one product item from, a third location outside the delivery rail system.

14. The method according to claim 9, wherein the method further comprises:
utilizing a robotic operator comprising at least one robot arm supported on a floor base, on a base above a delivery rail system on which the remotely operated delivery vehicle operates or on a delivery rail system on which the remotely operated delivery vehicle operates.

15. The method according to claim 14, wherein the method comprises:
moving the at least one robot arm in XYZ directions to access storage containers at different locations within the delivery rail system and transfer at least one item between the storage container within the delivery rail system and a third location outside the delivery rail system.

16. The method according to claim 13, wherein the third location is a transport container for storing one or more product items and wherein the method comprises operating the at least one robot arm for delivery of the at least one product item to the transport container for further transportation.

17. The method according to claim 9, wherein the method includes, after the storage container has been transported to the second location by the remotely operated delivery vehicle, picking at least one product item from the storage container by the robotic operator and automatically placing the picked at least one product item into the storage container such as to re-organize product items in the storage container.

18. The method according to claim 9, wherein the method includes, after the storage container has been transported the second location by the remotely operated delivery vehicle, picking at least one product item from the storage container by the robotic operator and placing the picked at least one product item in another storage container.

19. A method of transferring at least one product item between an automated storage and retrieval grid and a second location, the automated storage and retrieval grid comprising:
a container handling vehicle rail system comprising a first set of parallel rails arranged in a first horizontal plane and extending in a first direction, and a second set of parallel rails arranged in the first horizontal plane and extending in a second direction which is orthogonal to the first direction, which first and second sets of rails form a grid pattern in the first horizontal plane comprising a plurality of adjacent container handling vehicle grid cells, each container handling vehicle grid cell comprising a container handling vehicle grid opening defined by a pair of neighboring rails of the first set of parallel rails and a pair of neighboring rails of the second set of parallel rails;
a plurality of container handling vehicles guided on the container handling vehicle rail system, the plurality of container handling vehicles being operable to retrieve a storage container from a stack of storage containers beneath the container handling vehicle rail system;
a delivery column adapted for transport of a storage container between a container handling vehicle and a delivery port situated at a lower end of the delivery column;
a delivery rail system, the delivery rail system comprising a third set of parallel rails arranged in a second horizontal plane and extending in the first direction, and a fourth set of parallel rails arranged in the second horizontal plane and extending in the second direction which is orthogonal to the first direction; and
a remotely operated delivery vehicle configured to travel on the delivery rail system, the remotely operated delivery vehicle comprising a container carrier adapted to support the storage container;
wherein the delivery port is arranged at a level above the delivery rail system allowing the remotely operated delivery vehicle to be positioned directly below the delivery column; and
wherein the method comprises:
positioning a remotely operated delivery vehicle with a storage container to be filled at the second location;
using at least one robotic operator for placing at least one product item into the storage container, wherein the at least one robotic operator is able to reach multiple positions within the delivery rail system in order to access storage containers transported on remotely operated delivery vehicles and positioned at different locations with the delivery rail system;
using the remotely operated delivery vehicle to bring the storage container below a delivery port; and
operating a container handling vehicle on the container handling vehicle rail system to retrieve the storage container from the remotely operated delivery vehicle positioned below the delivery port through the delivery column.

20. A method of consolidating multiple items in an automated storage and retrieval grid and a second location, the automated storage and retrieval grid comprising:
a container handling vehicle rail system comprising a first set of parallel rails arranged in a first horizontal plane and extending in a first direction, and a second set of parallel rails arranged in the first horizontal plane and extending in a second direction which is orthogonal to the first direction, which first and second sets of rails form a grid pattern in the first horizontal plane comprising a plurality of adjacent container handling vehicle grid cells, each container handling vehicle grid cell comprising a container handling vehicle grid opening defined by a pair of neighboring rails of the first set of parallel rails and a pair of neighboring rails of the second set of parallel rails;
a plurality of container handling vehicles guided on the container handling vehicle rail system, the plurality of container handling vehicles being operable to retrieve a storage container from a stack of storage containers beneath the container handling vehicle rail system;

a delivery column adapted for transport of a storage container between a container handling vehicle and a delivery port situated at a lower end of the delivery column;

a delivery rail system, the delivery rail system comprising a third set of parallel rails arranged in a second horizontal plane and extending in the first direction, and a fourth set of parallel rails arranged in the second horizontal plane and extending in the second direction which is orthogonal to the first direction; and a remotely operated delivery vehicle configured to travel on the delivery rail system, the remotely operated delivery vehicle comprising a container carrier adapted to support the storage container;

wherein the delivery port is arranged at a level above the delivery rail system allowing the remotely operated delivery vehicle to be positioned directly below the delivery column; and wherein the method comprises:
    positioning a remotely operated delivery vehicle with a first storage container at the second location;
    positioning a consolidation vehicle with an item carrier at the second location;
    using at least one robotic operator for transferring at least one product item from the storage container carried by the remotely operated delivery vehicle into the item carrier, wherein the at least one robotic operator is able to reach multiple positions within the delivery rail system in order to access storage containers transported on remotely operated delivery vehicles and positioned at different locations within the delivery rail system;

transferring a second product item from the first storage container, or from a second storage container carried by another remotely operated delivery vehicle, into the item carrier of the consolidation vehicle by using the at least one robotic operator;

moving the consolidation vehicle to a consolidation area on the delivery rail system; and opening an openable sidewall or bottom section of the consolidation vehicle, such that the at least one product item and second product item are emptied from the item carrier in a horizontal or vertical direction.

\* \* \* \* \*